US012631789B2

(12) United States Patent
Rao et al.

(10) Patent No.: US 12,631,789 B2
(45) Date of Patent: May 19, 2026

(54) HIGH INDEX LENS INCLUDING UNIAXIAL OR BIAXIAL ORGANIC SOLID MATERIAL

(71) Applicant: META PLATFORMS TECHNOLOGIES, LLC, Menlo Park, CA (US)

(72) Inventors: Tingling Rao, Bellevue, WA (US); Xingzhou Tu, Redmond, WA (US); Lafe Joseph Purvis, II, Redmond, WA (US); Arman Boromand, Issaquah, WA (US); Kimberly Kay Childress, Duvall, WA (US); Andrew John Ouderkirk, Kirkland, WA (US); Ying Geng, Bellevue, WA (US); Poer Sung, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 768 days.

(21) Appl. No.: 17/704,466

(22) Filed: Mar. 25, 2022

(65) Prior Publication Data

US 2022/0342121 A1 Oct. 27, 2022

Related U.S. Application Data

(60) Provisional application No. 63/179,947, filed on Apr. 26, 2021.

(51) Int. Cl.
*G02B 1/02* (2006.01)
*B29D 11/00* (2006.01)
(Continued)

(52) U.S. Cl.
CPC ........ *G02B 1/041* (2013.01); *B29D 11/00269* (2013.01); *G02B 1/02* (2013.01);
(Continued)

(58) Field of Classification Search
CPC . G02B 1/041; G02B 1/02; G02B 3/08; G02B 27/0172; G02B 2027/0178; B29D 11/00269; B29D 11/00355
See application file for complete search history.

(56) References Cited

U.S. PATENT DOCUMENTS

| 10,520,729 B1 | 12/2019 | Wheelwright et al. |
| 2012/0123074 A1 | 5/2012 | Okada et al. |
| | (Continued) | |

FOREIGN PATENT DOCUMENTS

| CN | 110226110 A | 9/2019 |
| EP | 3163379 A1 | 5/2017 |
| | (Continued) | |

OTHER PUBLICATIONS

Invitation to Pay Additional Fees for International Application PCT/US2022/026079, mailed Jul. 27, 2022, 10 pages.
(Continued)

*Primary Examiner* — Mustak Choudhury

(74) *Attorney, Agent, or Firm* — Greenberg Traurig, LLP

(57) ABSTRACT

An optical element (e.g., a lens) may include an optically uniaxial or optically biaxial organic solid, for example, an organic molecular solid. The direction of a maximum refractive index of the organic solid may be aligned substantially orthogonal to an optical axis of the lens. In some examples, a device may include a display and an optical configuration configured to receive light from the display and direct the light to a remote view location. In some examples, the optical configuration may comprise a lens and at least one surface of the lens may include a plurality of facets, for example, to form a Fresnel lens.

20 Claims, 30 Drawing Sheets

(51) Int. Cl.

| | |
|---|---|
| *G02B 1/04* | (2006.01) |
| *G02B 3/08* | (2006.01) |
| *G02B 27/01* | (2006.01) |

(52) U.S. Cl.

CPC ........... *G02B 3/08* (2013.01); *G02B 27/0172* (2013.01); *G02B 2027/0178* (2013.01)

(56) References Cited

U.S. PATENT DOCUMENTS

| | | | |
|---|---|---|---|
| 2014/0368906 A1 | 12/2014 | Kim et al. | |
| 2015/0086799 A1* | 3/2015 | Kasyanova ........... | C08G 69/32 |
| | | | 427/520 |
| 2018/0074325 A1* | 3/2018 | Wheelwright ..... | G02B 27/0176 |
| 2018/0180889 A1 | 6/2018 | Lee et al. | |
| 2019/0227375 A1* | 7/2019 | Oh ........................ | G02B 5/1833 |
| 2021/0080724 A1 | 3/2021 | Sulai et al. | |
| 2021/0286204 A1* | 9/2021 | Hoffmann ........... | G02F 1/13439 |

FOREIGN PATENT DOCUMENTS

| | | | |
|---|---|---|---|
| TW | 457190 | B | 10/2001 |
| TW | 201512769 | A | 4/2015 |
| TW | 1553344 | B | 10/2016 |
| TW | 202103921 | A | 2/2021 |
| WO | 2020002930 | A1 | 1/2020 |

OTHER PUBLICATIONS

International Search Report and Written Opinion for International Application PCT/US2022/026079, mailed Sep. 19, 2022, 13 pages.
International Preliminary Report on Patentability for International Application No. PCT/US2022/026079, mailed Nov. 9, 2023, 10 pages.
Office Action mailed May 20, 2025 for European Application No. 22732356.5, filed Apr. 24, 2022, 04 pages.
Office Action mailed Dec. 24, 2025 for Taiwan Application No. 111115453, filed Apr. 22, 2022, 18 pages.

* cited by examiner

500

530

510

520

GROOVE DEPTH

560

550

540

1ST RING DIAMETER 2000                    4000                    6000

ANTHRACENE

1010

1020

*FIG. 11A*    *FIG. 11B*    *FIG. 11C*    *FIG. 11D*
*FIG. 11E*    *FIG. 11F*    *FIG. 11G*    *FIG. 11H*
*FIG. 11I*    *FIG. 11J*    *FIG. 11K*    *FIG. 11L*
*FIG. 11M*    *FIG. 11N*    *FIG. 11O*    *FIG. 11P*
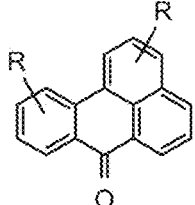
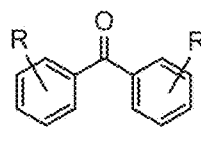
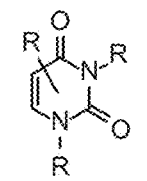
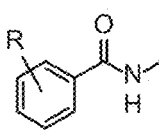
*FIG. 11Q*    *FIG. 11R*    *FIG. 11S*    *FIG. 11T*

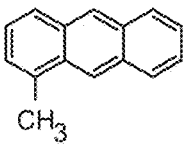
*FIG. 14A*
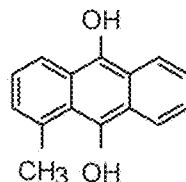
*FIG. 14B*
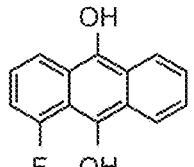
*FIG. 14C*
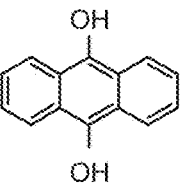
*FIG. 14D*
*FIG. 15A*
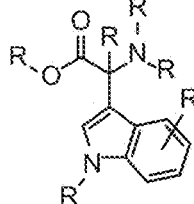
*FIG. 15B*
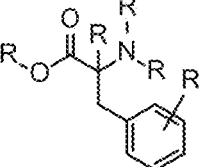
*FIG. 15C*
*FIG. 15D*
*FIG. 15E*
*FIG. 15F*
*FIG. 15G*
*FIG. 15H* n =1, 2, 3, 4

$n=0, 1, 2, 3, 4,$ $n=0, 1, 2, 3, 4$

ENANTIOMERICALLY PURE
OR RACEMIC MIXTURE $n=0, 1, 2, 3, 4$

ENANTIOMERICALLY PURE
OR RACEMIC MIXTURE

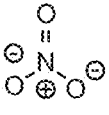
*FIG. 23A*
*FIG. 23B*
*FIG. 23C*
*FIG. 23D*
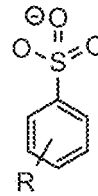
*FIG. 23E*
*FIG. 23F*
*FIG. 23G*
*FIG. 23H*
*FIG. 23I*
*FIG. 24A*
*FIG. 24B*
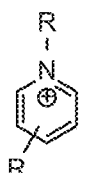
*FIG. 24C*
*FIG. 24D*
*FIG. 24E*
*FIG. 24F*
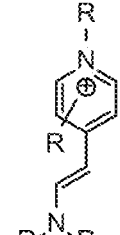
n = 0, 1, 2, 3, 4...
*FIG. 24G*
*FIG. 24H*

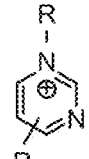
FIG. 24I
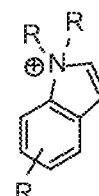
FIG. 24J
FIG. 24K
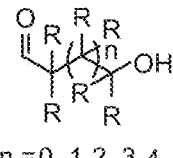
n = 0, 1, 2, 3, 4,
FIG. 25
DIACIDS
FIG. 26A
FIG. 26B
n = 0, 1, 2, 3, 4,
FIG. 26C
FIG. 26D

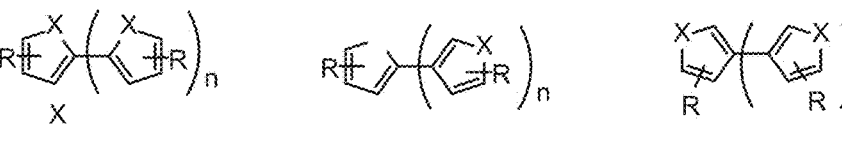
*FIG. 27A*          *FIG. 27B*          *FIG. 27C*
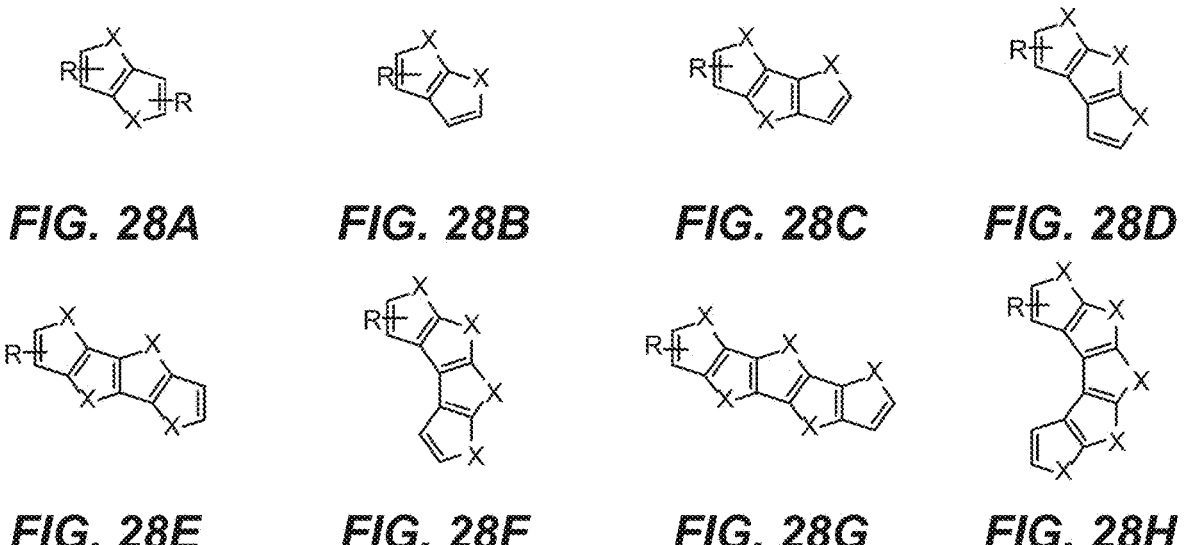
*FIG. 28A*          *FIG. 28B*          *FIG. 28C*          *FIG. 28D*
*FIG. 28E*          *FIG. 28F*          *FIG. 28G*          *FIG. 28H*

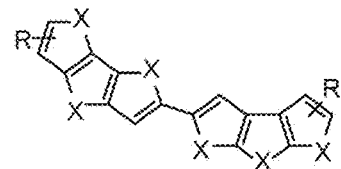
*FIG. 29A*
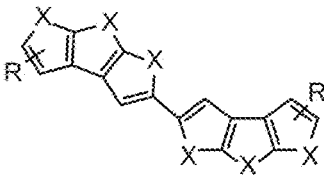
*FIG. 29B*
*FIG. 29C*
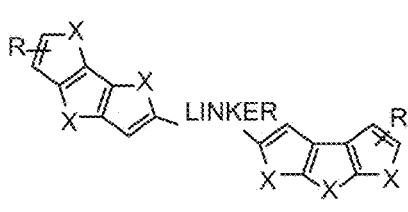
*FIG. 29D*
*FIG. 29E*
*FIG. 29F*
*FIG. 29G*
*FIG. 29H*
*FIG. 29I*
*FIG. 29J*
*FIG. 29K*

Method
3500

Start

Fabricate optical material as anisotropic organic solid
3510

Form at least one refractive surface in the
optically anisotropic organic solid
3520

Fabricate the optical element using the
optically anisotropic organic solid
3530

End

System
3800

3804

3802

3806(A)

3806(B)

HIGH INDEX LENS INCLUDING UNIAXIAL OR BIAXIAL ORGANIC SOLID MATERIAL

CROSS REFERENCE TO RELATED APPLICATION

This application claims the benefit of U.S. Provisional Application No. 63/179,947, filed Apr. 26, 2021, the disclosure of which is incorporated, in its entirety, by this reference.

BRIEF DESCRIPTION OF THE DRAWINGS

The accompanying drawings illustrate a number of exemplary examples and are a part of the specification. Together with the following description, these drawings demonstrate and explain various principles of the present disclosure.

FIGS. 11A-11T, 12A-12Q 13A-13I, 14A-14D, 15A-15H, 16A-16M, 17A-17G, and 18A-18B show example molecular structures that may be used as optical materials or components thereof according to various embodiments.

FIGS. 19A-19N, 20A-20I, 21A-21D, 22A-22D, 23A-23I, 24A-24K, and FIG. 25 show further example molecular structures that may be used as optical materials or components thereof according to various embodiments.

FIGS. 26A-26D, 27A-27C, 28A-28H, 29A-29K, 30A-30H, and 31A-31I show further example molecular structures that may be used as optical materials or components thereof according to various embodiments.

Figure 1:
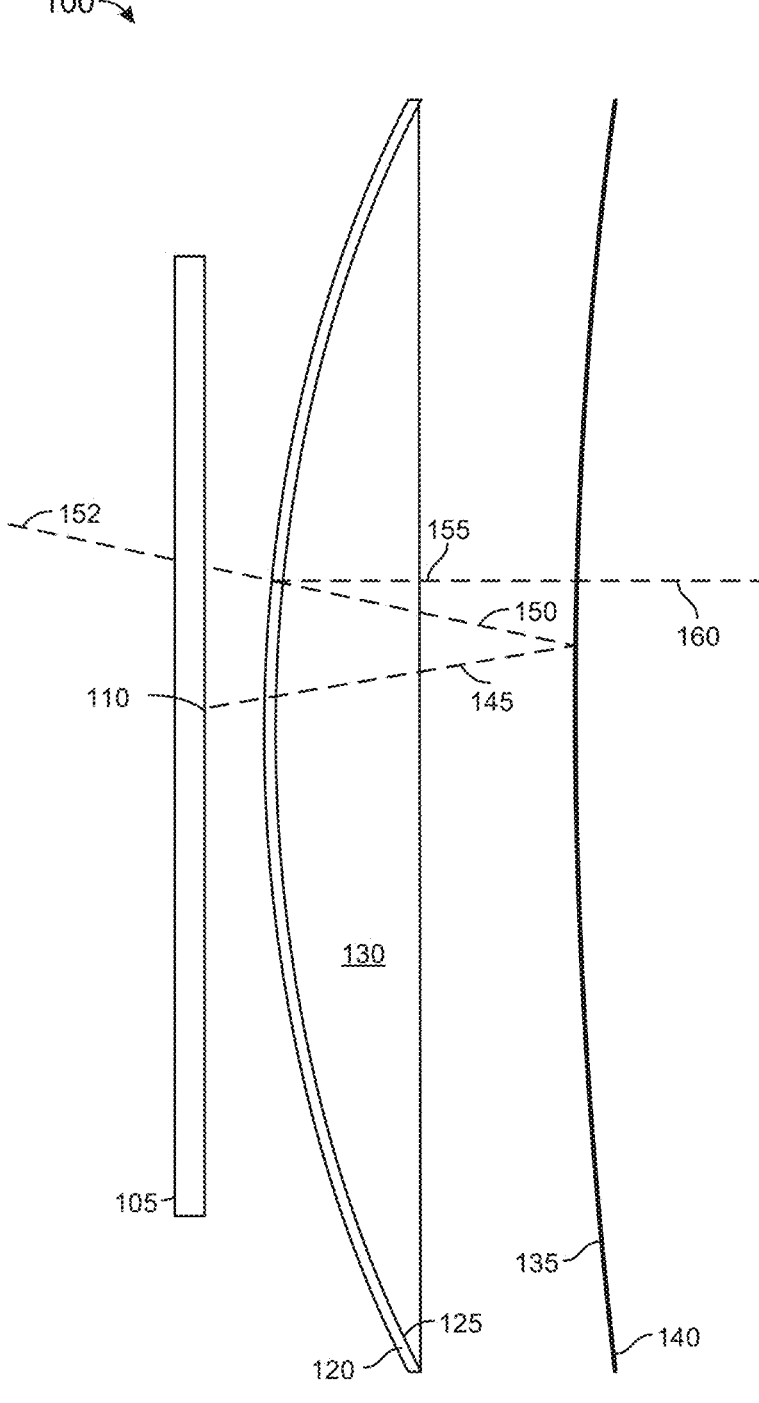
FIG. 1 shows an example optical configuration of a device in accordance with various embodiments.

Throughout the drawings, identical reference characters and descriptions indicate similar, but not necessarily identical, elements. While the exemplary examples described herein are susceptible to various modifications and alternative forms, specific examples have been shown by way of example in the drawings and are described in detail herein. However, the exemplary examples described herein are not intended to be limited to the particular forms disclosed. Rather, the present disclosure covers all modifications, equivalents, and alternatives falling within the scope of the appended claims.

DETAILED DESCRIPTION OF EXEMPLARY EXAMPLES

Organic materials may be incorporated into a variety of different optic and electro-optic device architectures, including active and passive optics and electroactive devices. Lightweight and conformable, one or more organic layers may be incorporated into wearable devices such as smart glasses and are attractive candidates for emerging technologies including virtual reality/augmented reality devices where a comfortable, adjustable form factor is desired.

Augmented reality (AR) and/or virtual reality (VR) eyewear devices or headsets (sometimes referred to as AR/VR apparatus), for example, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. AR/VR (augmented reality and/or virtual reality) eyewear devices and headsets may be used for a variety of purposes. For example, governments may use such devices for military training, medical professionals may use such devices to simulate surgery, and engineers may use such devices as design visualization aids.

These and other applications may leverage one or more characteristics of thin film organic materials, including the refractive index to manipulate light. As virtual reality headsets evolve toward higher resolution, larger fields of view, higher efficiency, smaller form factors, and lower weight, additional challenges may be encountered in design, manufacturing, and choice of materials. In the example of a Fresnel lens, resolution is typically limited by the available refractive indices of common materials such as cyclic-olefin polymers. On the other hand, although inorganic crystals may provide higher indices of refraction, their associated cost of manufacture may be uneconomical.

It would be advantageous to provide manufacturable organic materials having improved optical properties including a high refractive index. As disclosed herein, an optical assembly, such as a lens system, may include a high index organic solid material. A high index organic solid crystal material, for instance, may include uniaxially oriented or biaxially oriented crystallites. Glassy or amorphous anisotropic organic solid materials may include a preferred orientation or alignment of molecules therein. The organic solid materials may include crystalline (e.g., single crystal), partially crystalline, polycrystalline, or amorphous materials such as anisotropic glasses. In some example, an organic solid material may include the solid phase of a mesogenic material, such as a nematogen and/or smectogen.

An example Fresnel structure (e.g., lens) may be characterized by an oblique facet, a draft facet, and a draft angle, where the draft angle may be determined based on a distance of a respective Fresnel structure to a center of the lens. An oblique facet may be non-normal and non-perpendicular to the optical axis. In some examples, a central facet of a Fresnel lens may not be oblique. An example Fresnel lens with a plurality of facets may be used in a display device where it may be coupled with an electronic display, for example, to output light through the Fresnel lens.

In some examples, an optical element including a high index organic solid material may be located within the transparent aperture of an optical device such as a lens, although the present disclosure is not particularly limited and may be applied in a broader context. By way of example, an optical element may be incorporated into a tunable lens, accommodative optical element, adaptive optics, etc.

Example optical elements may form a lens or a window in an artificial reality or virtual reality device. Further example optical elements may define a surface, for example, of a watch, phone, tablet, TV, monitor, and the like, or form an interlayer, for example, between a light source and a light receiver. According to various examples, the optical elements disclosed herein may be configured as an optical grating. An optical element may be optically transparent.

Examples include a device, such as a device including an optical element such as a lens, including at least one high index organic solid material, as well as chemical structures, device configurations, methods of preparation of solid materials, methods of device manufacture, and applications. A high index material may have a maximum value of refractive index greater than 1.5, and in some examples greater than 1.6. An example solid material may have mutually orthogonal refractive indices along orthogonal directions. The principal axes of an organic solid material may be related to the orientation of the material, such as the orientation of the major index component within an example solid material. In some examples, an optical element may include a Fresnel lens including a high index organic solid material. In some examples, a device may include a thermally dissipative optical element as disclosed herein. Example small molecules suitable for forming optically anisotropic organic solid materials are shown in the figures, but these examples are not limiting and include derivatives, analogs, other materials having similar chemical and/or physical properties, mixtures, oligomers, polymers, and other materials including example compounds and/or chemically related moieties.

In some examples, a high index lens may include a plurality of Fresnel structures, each having a sloped facet and a draft facet. In some examples, a high index lens may include a plurality of prismatic structures. In further examples, a high index lens may include a plurality of micro mirror arrays (MMAs). In still further examples, a high index lens may include a plurality of grating structures, for example, each having a slant angle ranging from 0° to 90°.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 32:
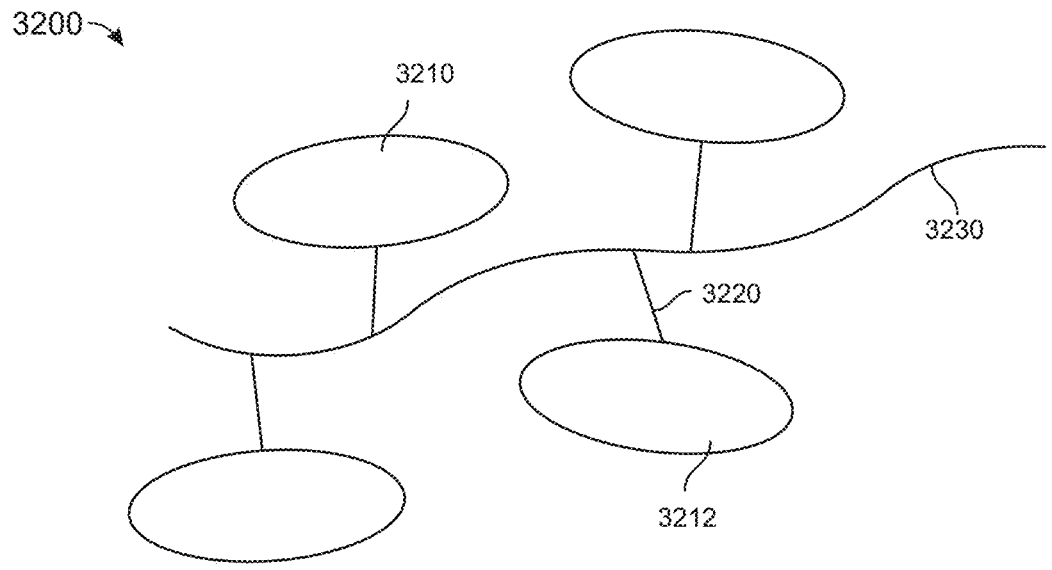
FIG. 32 illustrates a schematic structure of a side chain polymer material according to some embodiments.
Figure 33:
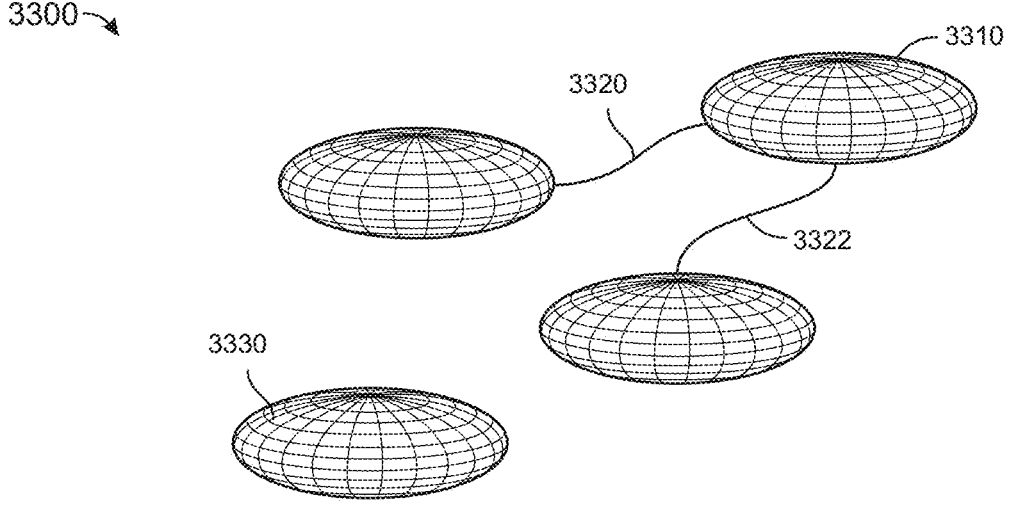
FIG. 33 schematically illustrates oblate spheroids or disk-shaped molecular moieties that may be interconnected by linker groups according to some embodiments.
Figure 34:
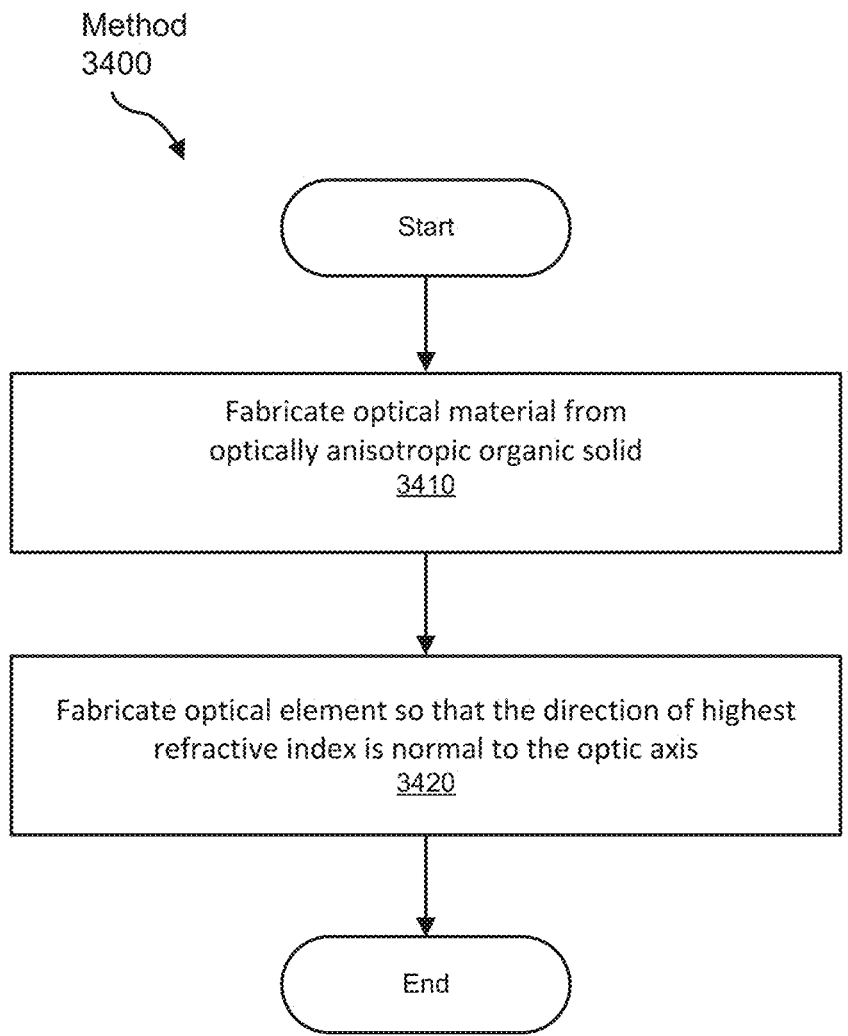
FIG. 34 illustrates an example method of fabrication of an optical element according to some embodiments.
Figure 35:
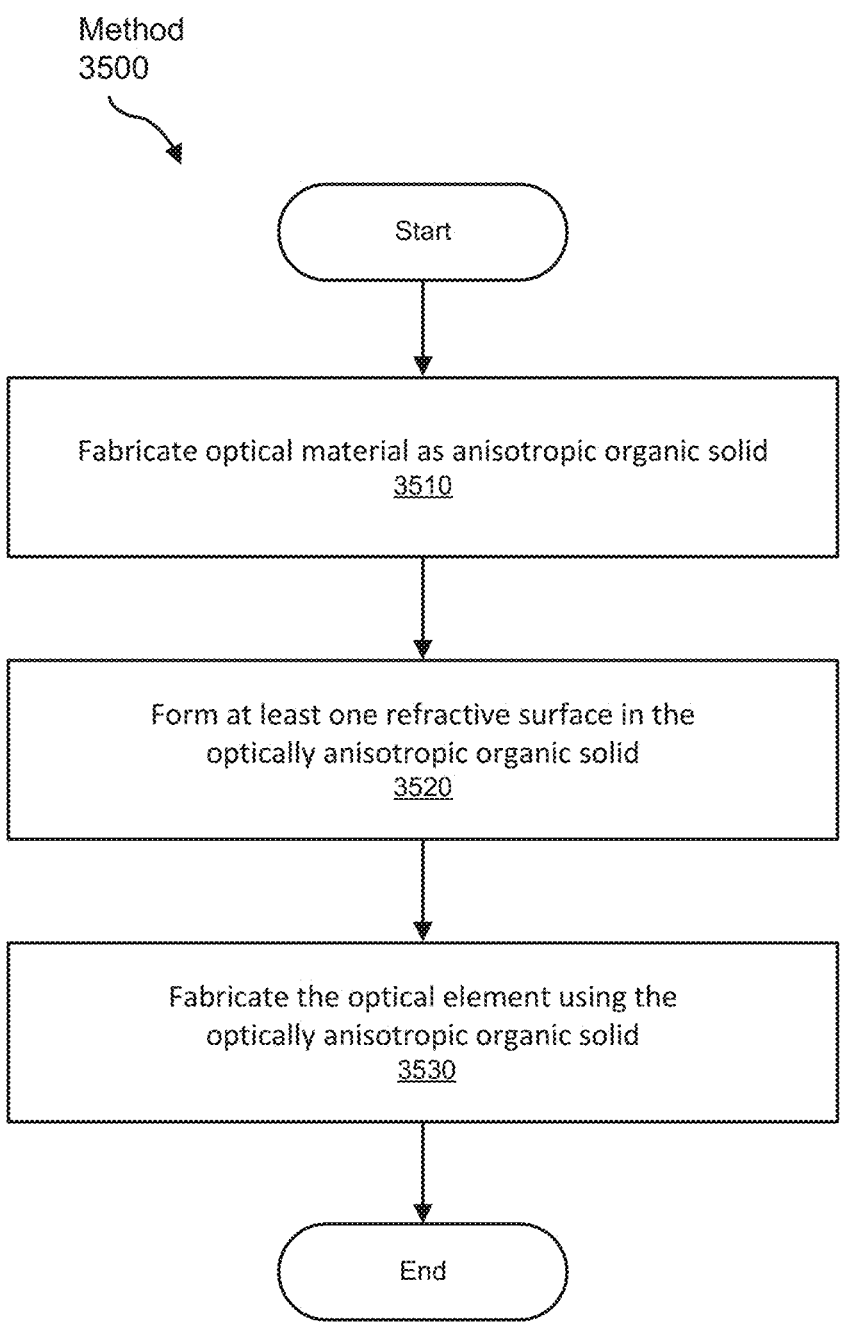
FIG. 35 illustrates an example method of fabrication of a lens according to some embodiments.
Figure 36:
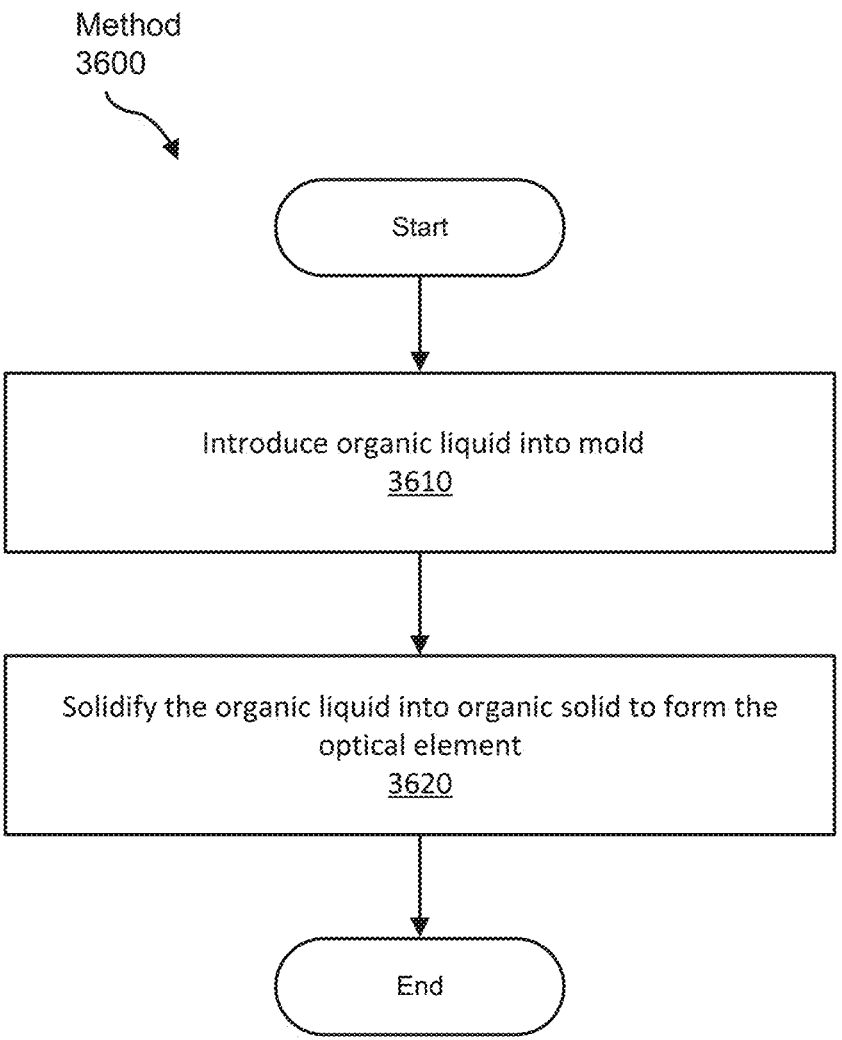
FIG. 36 illustrates an example method of fabrication of an optical element according to some embodiments.
Figure 37:
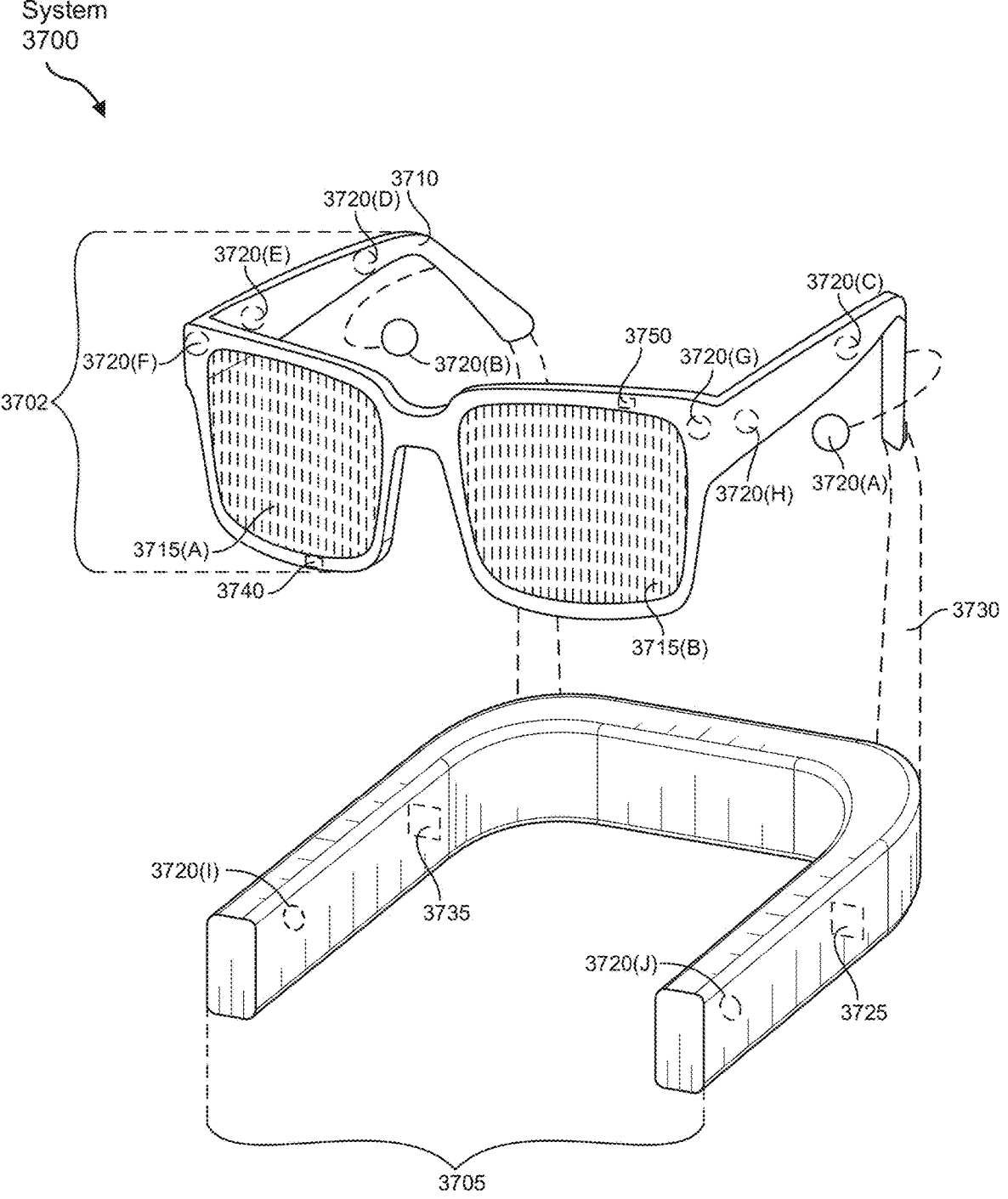
FIG. 37 is an illustration of exemplary augmented-reality glasses that may be used in connection with embodiments of this disclosure.
Figure 38:
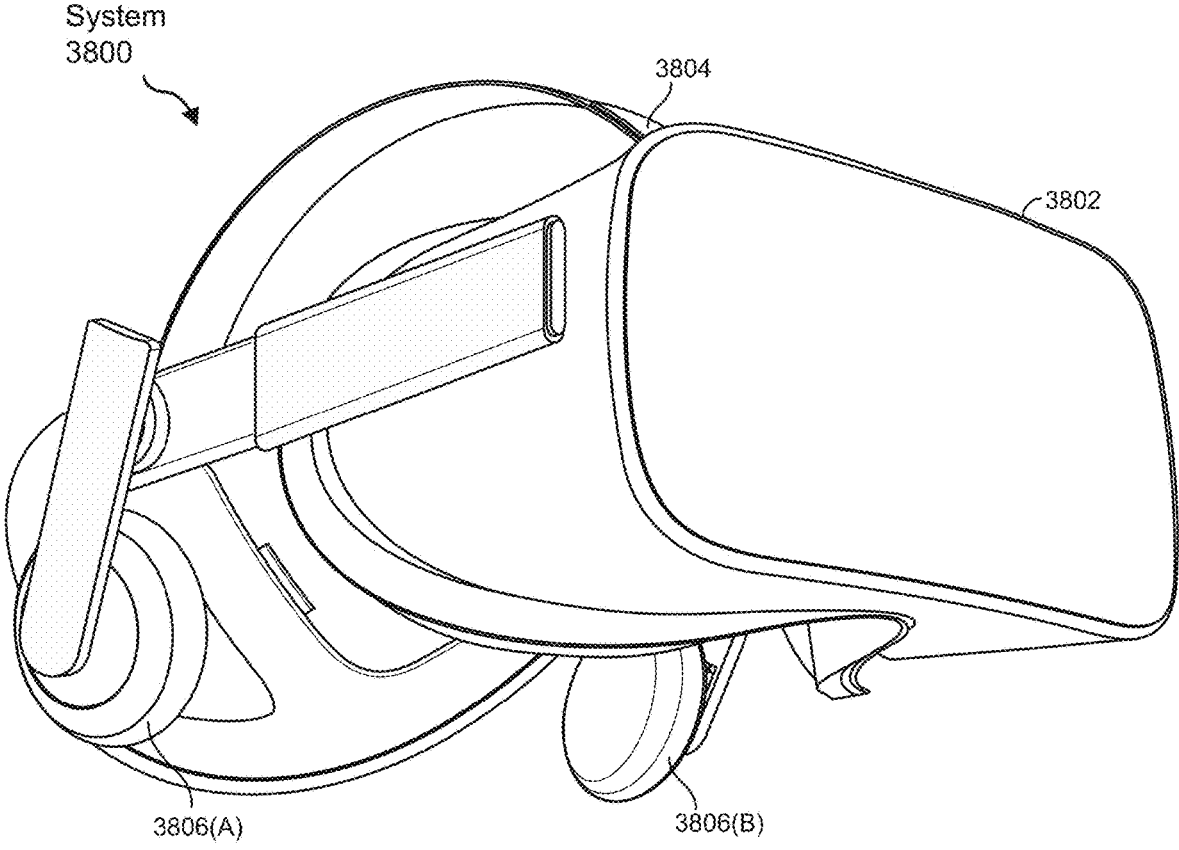
FIG. 38 is an illustration of an exemplary virtual-reality headset that may be used in connection with embodiments of this disclosure.

The following provides, with reference to FIGS. 1-38, detailed descriptions of example embodiments. FIGS. 1-3 show an example display and imaging system and lens configurations. FIGS. 4-10B show example solid materials and material processing examples. FIGS. 11A-31I show representative molecular substrates. FIGS. 32 and 33 illustrate example molecular structures including linker groups. FIGS. 34-36 show example methods. FIGS. 37 and 38 show example augmented reality and virtual reality systems.

FIG. 1 shows an optical configuration 100 including a display 105, beamsplitter 120, lens 130 and a polarized reflector 140. Light beams emitted by the display are shown as dashed lines. A light ray 145 is emitted by a display portion 110 of display 105, passes through the beamsplitter 120 and lens 130, and is reflected back as ray 150 from the polarized reflector 140. Refraction at the lens surfaces is not shown for illustrative convenience. The ray 150 is then reflected by the beamsplitter to give ray 155 which passes through the polarized reflector and is directed towards the eye of a user as ray 160. Stray light beams such as light beam 152 may reduce the beam intensity that reaches the eye of a user. The eye of a user is not shown, but a viewing location such as an eyebox may be located to the right of the optical configuration as illustrated. In some examples, the beamsplitter 120 may be formed as a partially reflective film (e.g., a thin metal film) on the convex surface 125 of the lens 130. In some examples, the optical configuration may further include an optical retarder which may, for example, be included as a layer formed on surface 135 of the polarized reflector 140.

Improvements in the resolution of the optical configuration 100 and reductions in weight and power consumption in device applications are desirable. The lens 130 may be a refractive lens, and in some examples a Fresnel lens may be used. A Fresnel lens may effectively divide a curved surface of a refractive lens (e.g., shown as convex surface 125 in FIG. 1) into curved portions (sometimes referred to as facets) with steps between the curved portions, allowing the thickness of a Fresnel lens to be lower. Fresnel lenses are discussed in more detail below. In some examples, the beam splitter may include a partially reflective film formed on the curved portions or facets. In some examples, the lens may be a Fresnel lens, and the polarized reflector and (optional) optical retarder may have a planar configuration.

Figure 2A:
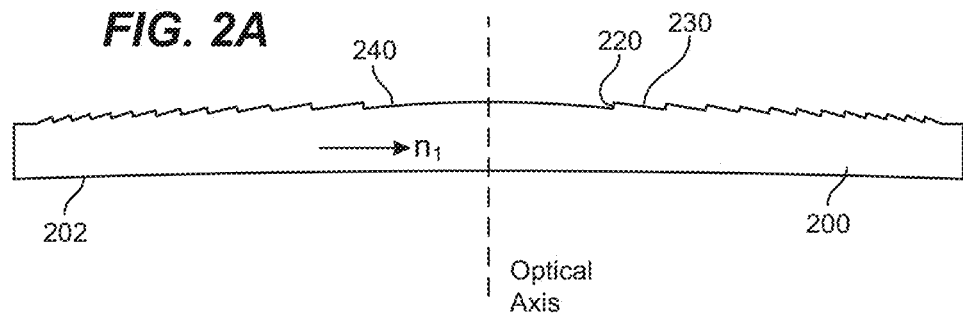
FIGS. 2A-2C illustrate a Fresnel lens and a mutually orthogonal set of refractive indices along principal axes of an optically anisotropic organic material according to some embodiments.
Figure 3:
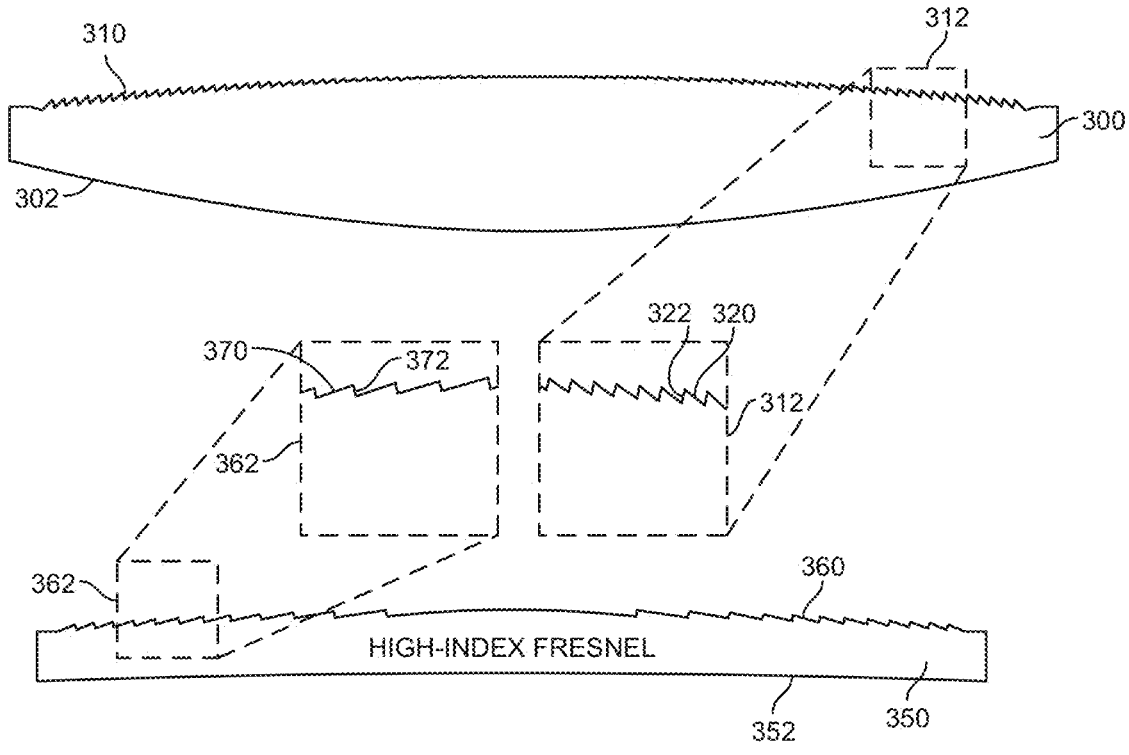
FIG. 3 illustrates a Fresnel lens size reduction using a high-index material according to some embodiments.

FIG. 2A shows an example Fresnel lens 200 having a planar surface 202 and a profiled surface having a surface profile including facets 230 (e.g., that may function as refractive surface segments) and steps 220. The profiled surface may include surface portions that may approximate portions of a curved lens profile, such as a convex lens surface. For example, the central portion 240 (sometimes termed the central facet) may approximate the central portion of a non-Fresnel curved lens surface. The surface portions of a Fresnel lens may be curved. In some examples, the surface portions may be planar and oblique to the direction of the optical axis.

In some examples, the Fresnel lens may be circular. The lens shown in FIG. 2A may represent a cross-section through a circular Fresnel lens. Other shapes are possible, such as rectangular, square, oval, elliptical, and the like.

In some examples, the Fresnel lens 200 may include an optical material, such as a uniaxial or biaxial optical material having a refractive index ($n_1$) along a direction orthogonal to the optical axis of the lens. The optical axis extends through the center of the Fresnel lens 200 and may be normal to the planar surface 202. In some examples, $n_1$ may represent the refractive index of the optical material along a direction of maximum refractive index. In some examples, the optical material may be an organic solid material, such as an optically anisotropic organic solid material. In some examples, the optical material may be an optically anisotropic organic glass. In some examples, the optical material may be an optically anisotropic organic crystal.

In some examples, optical anisotropy of the optical material may be induced by preferential molecular alignment, such as molecular alignment within an optical material such as a crystal or glass. In some examples, optical anisotropy of an amorphous or polycrystalline material may be induced by crystal orientation and may be related to crystal packing effects that may be controlled within the growth process. These aspects are discussed in more detail below.

In some examples, the profiled surface of a Fresnel lens may be referred to as the first surface and the other surface may be referred to as the second surface. The second surface may be planar (as illustrated in FIG. 2A), or, in some examples, may be concave or convex. In some examples, the second surface may be a second profiled surface.

In some examples, a Fresnel lens may include an optical material, such as glass, polymer, or crystalline material. In some examples, the optical material may be optically uni-axial or optically biaxial.

Figure 2B:
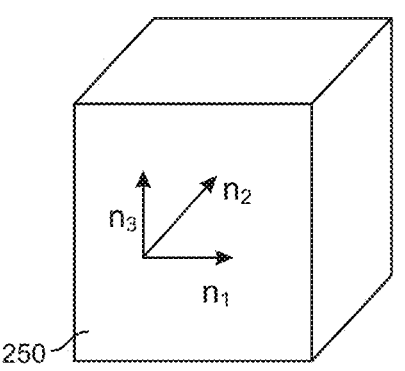

FIG. 2B denotes a block of optical material 250. The optical material may have a first refractive index $n_1$ along a first direction, a second refractive index $n_2$ along a second direction, and a third refractive index $n_3$ along a third direction. The first, second, and third directions may be mutually orthogonal and may be represented by suitably labeled Cartesian axes, for example, as x, y, and z axes respectively. For a uniaxial material, $n_2$ may equal $n_3$. In some examples, for a uniaxial or biaxial material, $n_1$ may be used to refer to the higher or highest refractive index component respectively. In some examples, the orientation of the greatest index may be orthogonal to an optical axis of an example optical element.

Figure 2C:
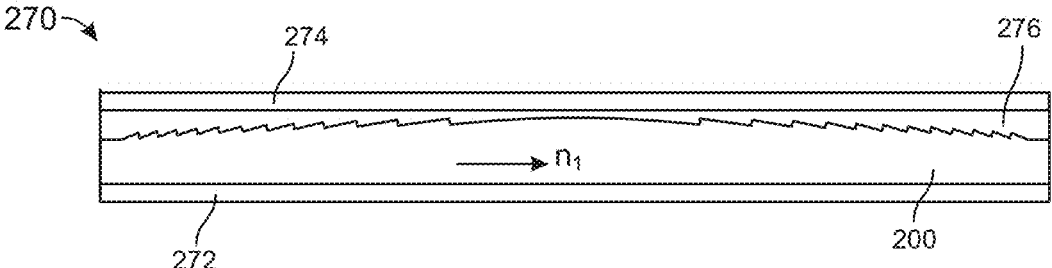

FIG. 2C denotes an optical assembly 270 similar in optical properties to the Fresnel lens 200 of FIG. 2A. In this example, the Fresnel lens 200 (including an organic solid) is located at least in part between first and second substrates which may, for example, include glass or a polymer. In some examples, the optical material may be grown on the first substrate. The first substrate 272 may support or include an alignment layer (e.g., a grating structure, grooves, or a rubbed or otherwise aligned polymer) used to align the optical material. The second substrate 274 may provide mechanical protection for the profiled upper surface of the optical material. A gap 276 between the profiled substrate and the second substrate may include a gas (e.g., air, nitrogen, a rare gas such as argon, or other gas that is non-reactive with the optical material), a liquid, or a solid having a different refractive index (e.g., substantially lower than) the refractive index of the optical material used to fabricate the Fresnel lens. Further representative examples are discussed further below, for example, in relation to FIG. 8.

FIG. 3 illustrates a Fresnel lens size reduction using a high-index material, such as an organic solid. The figure shows a first Fresnel lens 300 having a convex surface 302 and a profiled surface 310 shown in more detail in inset enlargement 312. The distance between steps may be in the range 0.1 mm-5 mm, though this is exemplary and not limiting. The profiled surface 310 includes refractive surfaces (facets) 320 and steps 322. The convex surface 302 may be used to obtain a higher lens power but adds mass and increases the center thickness of the first Fresnel lens 300.

FIG. 3 also shows a second Fresnel lens 350 fabricated using a higher index optical material than used for first Fresnel lens 300. The second Fresnel lens includes a planar surface 352 in place of the convex surface 302 of the first Fresnel lens 300. The use of a planar surface reduces the mass and center thickness of the second Fresnel lens. The second Fresnel lens 350 includes a profiled surface 360, shown in more detail in inset enlargement 362, including refractive surfaces (facets) 370 and steps 372. The facets of the second Fresnel lens 350 may be wider (in a direction orthogonal to the optical axis) than for the first Fresnel lens 300.

In some examples, a Fresnel lens may include a high refractive index and birefringent organic solid material and may have reduced mass, dimensions, and may be a relatively high resolution lens. A high refractive index may be a refractive index greater than approximately 1.5. In some examples, a Fresnel lens may include an organic solid body and may have at least one patterned surface. In some examples, an organic solid body may be located on a substrate, such as a glass or polymer substrate.

Figure 4A:
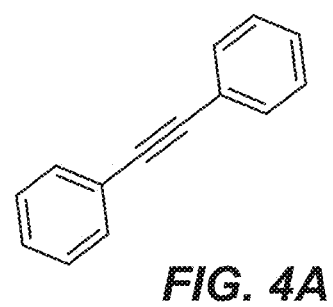
FIGS. 4A-4C illustrate planarization of the faces of a tolane crystal according to some embodiments.

FIG. 4A represents the chemical structure of tolane, also known as diphenylacetylene or 1,1'-ethynediyldibenzene.

Figure 4B:
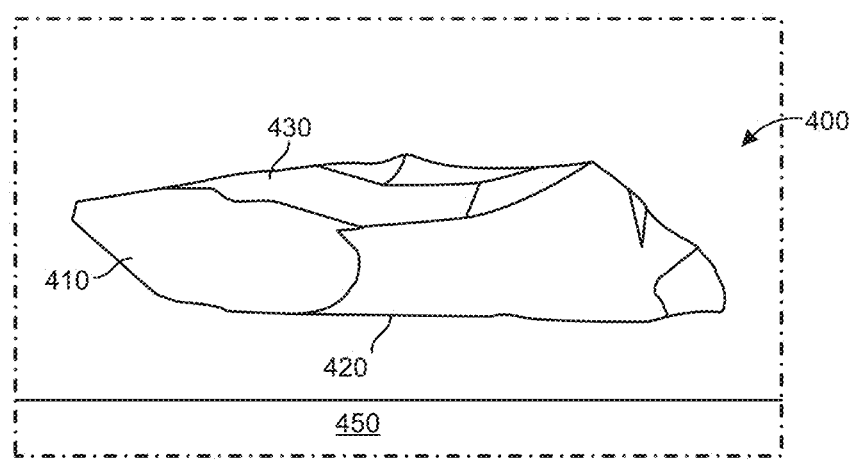

FIG. 4B is a simplified view 400 of a tolane crystal 410 and a portion of a polisher 450, in which the lower surface 420 may be polished to a plane surface by polisher 450. The polisher may include a spinning disk and polishing of an organic solid such as a tolane crystal may be performed by bringing the organic solid into contact with the spinning disk. This process may be an example of planarization of a surface of an organic solid. The figure shows only a portion of the polisher within the simplified view 400. The upper portion of the tolane crystal may include irregular faces such as face 430.

Figure 4C:
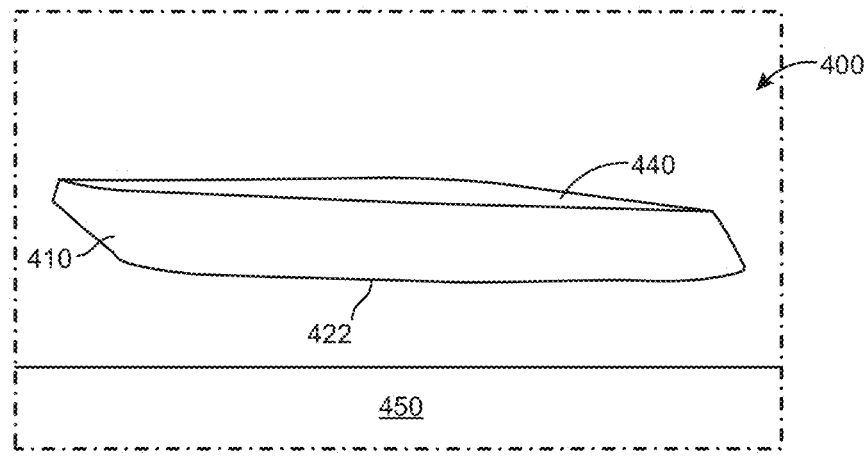

FIG. 4C is a simplified representation of a tolane crystal 410, in which both the lower surface 422 and upper surface 440 have been polished or otherwise planarized to parallel plane surfaces by polisher 450. The figure shows only a portion of the polisher within simplified view 400. The upper portion of the tolane crystal 410 may include irregular facets. A tolane crystal similar to that shown in FIG. 4B was polished using a Diablap polisher (Uhl Technologies, Franklin, Pa.), and excellent planarization of the crystal surfaces was obtained, resulting in a planarized crystal similar to that shown in FIG. 4C.

Figure 5A:
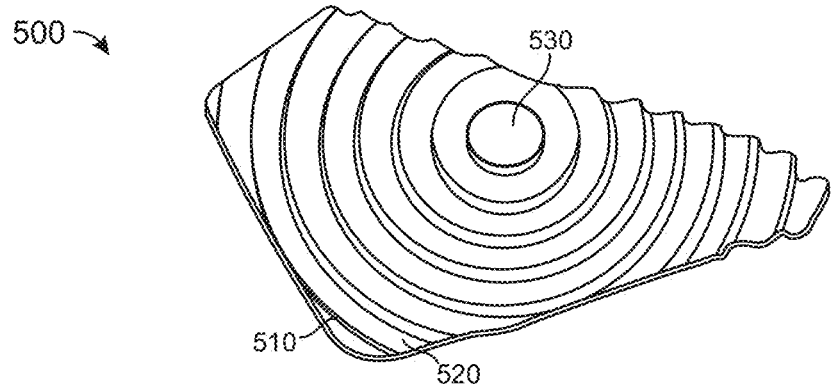
FIGS. 5A-5B illustrate a Fresnel lens formed in a tolane crystal according to some embodiments.

FIG. 5A shows a representation of a Fresnel lens 500 formed in a tolane crystal, for example, using diamond turning. The surface of the crystal is patterned to include facets 520 separated by steps 510. The facets and steps are concentric around a central facet 530. In this example, the dimensions of the tolane crystal restricted the formation of a uniform circular lens.

Figure 5B:
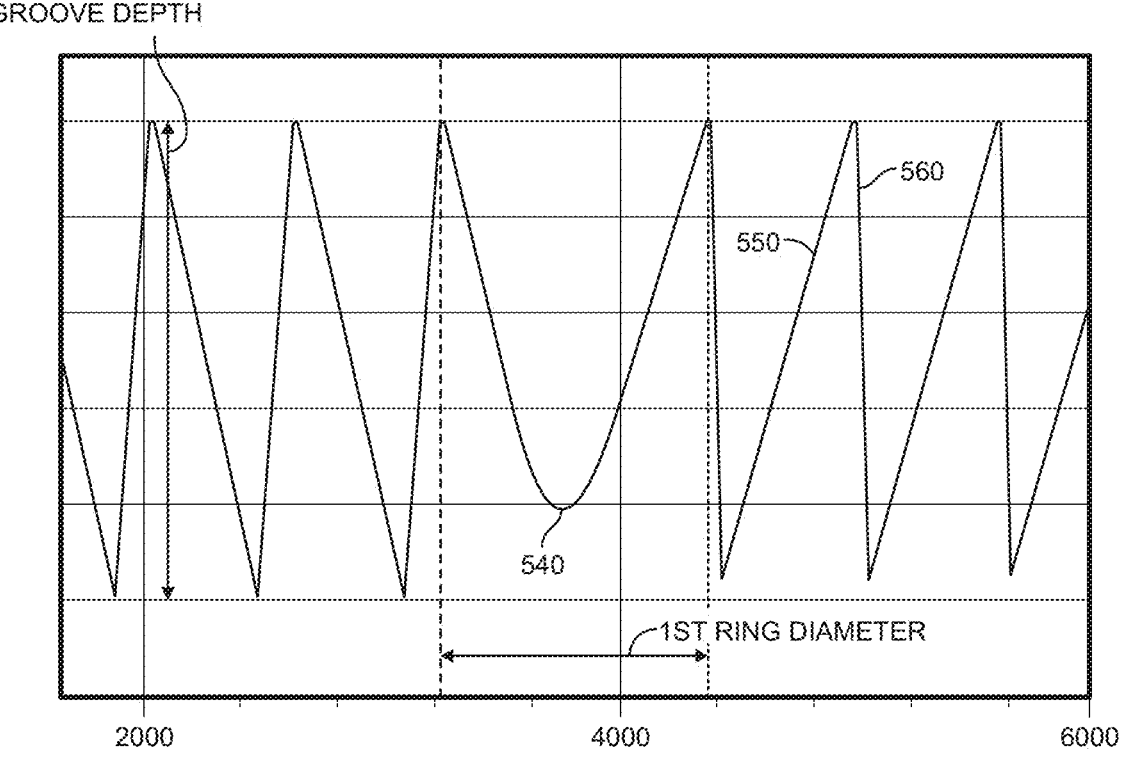

FIG. 5B show a surface profile introduced into the tolane crystal (e.g., by diamond turning) to form the lens of FIG. 5A above. The surface profile includes facets 550 and steps 560. The central portion includes a depression 540, but this is optional. In some examples, the facets may include oblique facets may be inclined at an angle to the optical axis of the lens, where the angle is a function of the radial position of the facet relative to the center of the lens. Facets further from the center of the lens may be more steeply inclined (e.g., the facets may be further from perpendicular to the optical axis). The facets may approximate the curved surface of, for example, a convex refractive lens using linear segments.

Figure 6A:
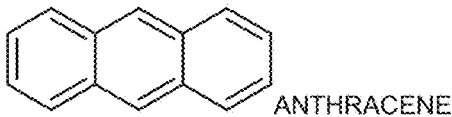
FIGS. 6A-6C illustrate planarization of the surfaces of an anthracene crystal according to some embodiments.

FIG. 6A shows the chemical structure of anthracene.

Figure 6B:
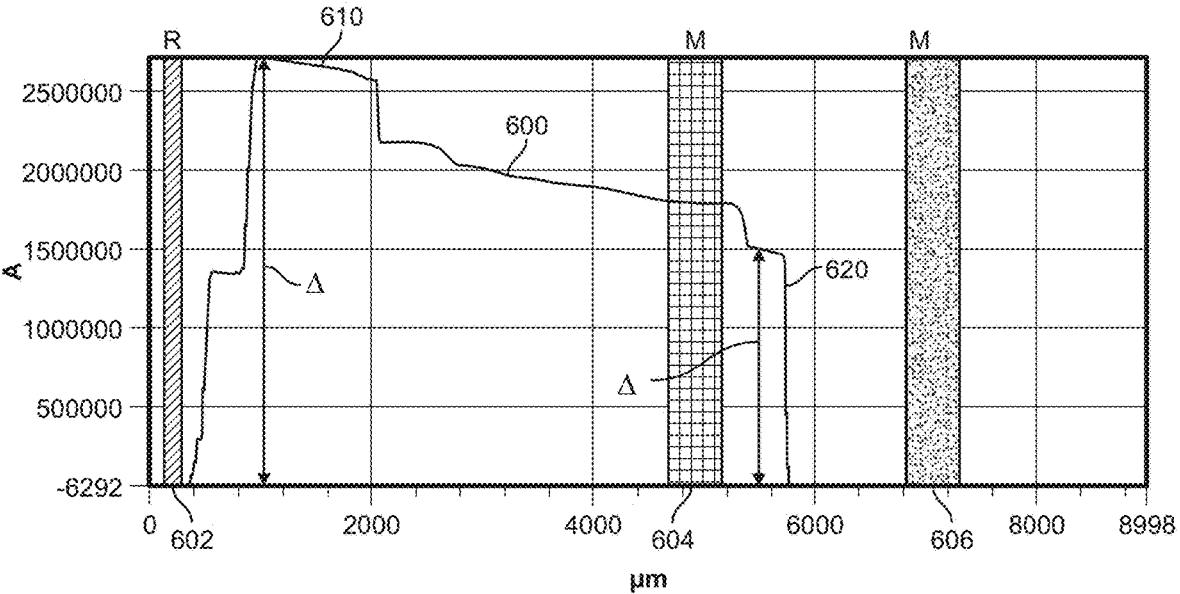

FIG. 6B shows the upper surface profile of an anthracene crystal. The lower surface of the crystal is planar, for example, through growth on a planar surface and/or polishing the lower surface. The upper surface is irregular, having a raised portion 610 and an irregular sloping portion 600. The crystal has edges such as right edge 620. The illustrated bands 602, 604, and 606 are representative of portions of the crystal height profile, including a band 602 within a left portion of the height profile curve on the outside of the left edge of the crystal, a band 604 within a central portion of the height profile curve within the crystal, and a band 606 within a right portion of the height profile curve outside of the right edge (620) of the crystal. The pre-planarization step height A may be in the range of 50 microns-2 mm, and the crystal thickness may vary appreciably over the extent of the crystal. The abscissa represents linear distance in microns, and the ordinate represents height (A) in arbitrary units.

Figure 6C:
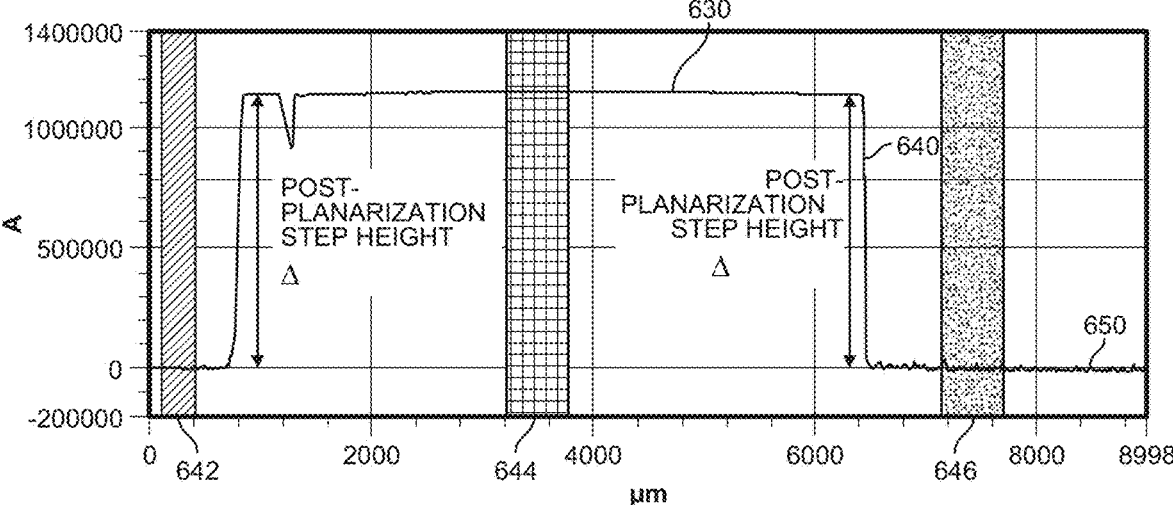

FIG. 6C shows the upper surface profile of the anthracene crystal of FIG. 6B after planarization. The upper surface 630 is generally planar and parallel to the lower surface. The illustrated bands 642, 644, and 646 are representative of portions of the height profile curve, including a band 642 within a left portion of the height profile curve on the outside of the left edge of the crystal, a band 644 within a central portion of the height profile curve within the crystal, and a band 646 within a right portion (650) of the height profile curve outside of the right edge (640) of the crystal. The post-planarization step height Δ (crystal thickness) may be in the range of 50 microns-1 mm, for example, between approximately 20 microns and approximately 500 microns, such as between approximately 50 microns and 200 microns. The crystal thickness uniformity is greatly improved for the planarized crystal of FIG. 6C compared with the non-planarized crystal of FIG. 6B, as the post-planarization step heights are uniform for left and right edges of the crystal compared with those shown in FIG. 6B.

Figure 7A:
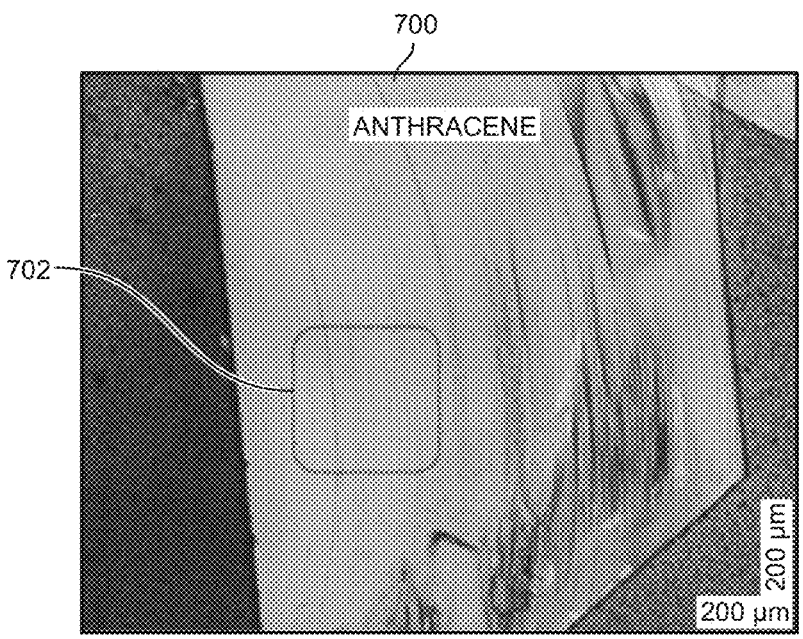
FIGS. 7A-7C further illustrate planarization of the surfaces of an anthracene crystal according to some embodiments.

FIG. 7A shows a representation of an anthracene crystal 700. The surface is generally planar but includes minor irregularities.

Figure 7B:
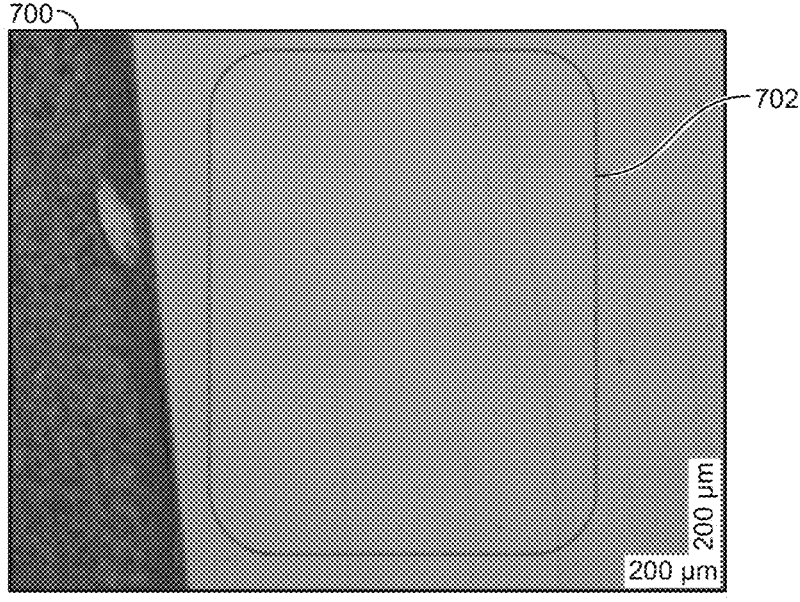

FIG. 7B shows a portion 702 of the anthracene crystal 700 after planarization, showing no visually discernable irregularities.

Figure 7C:
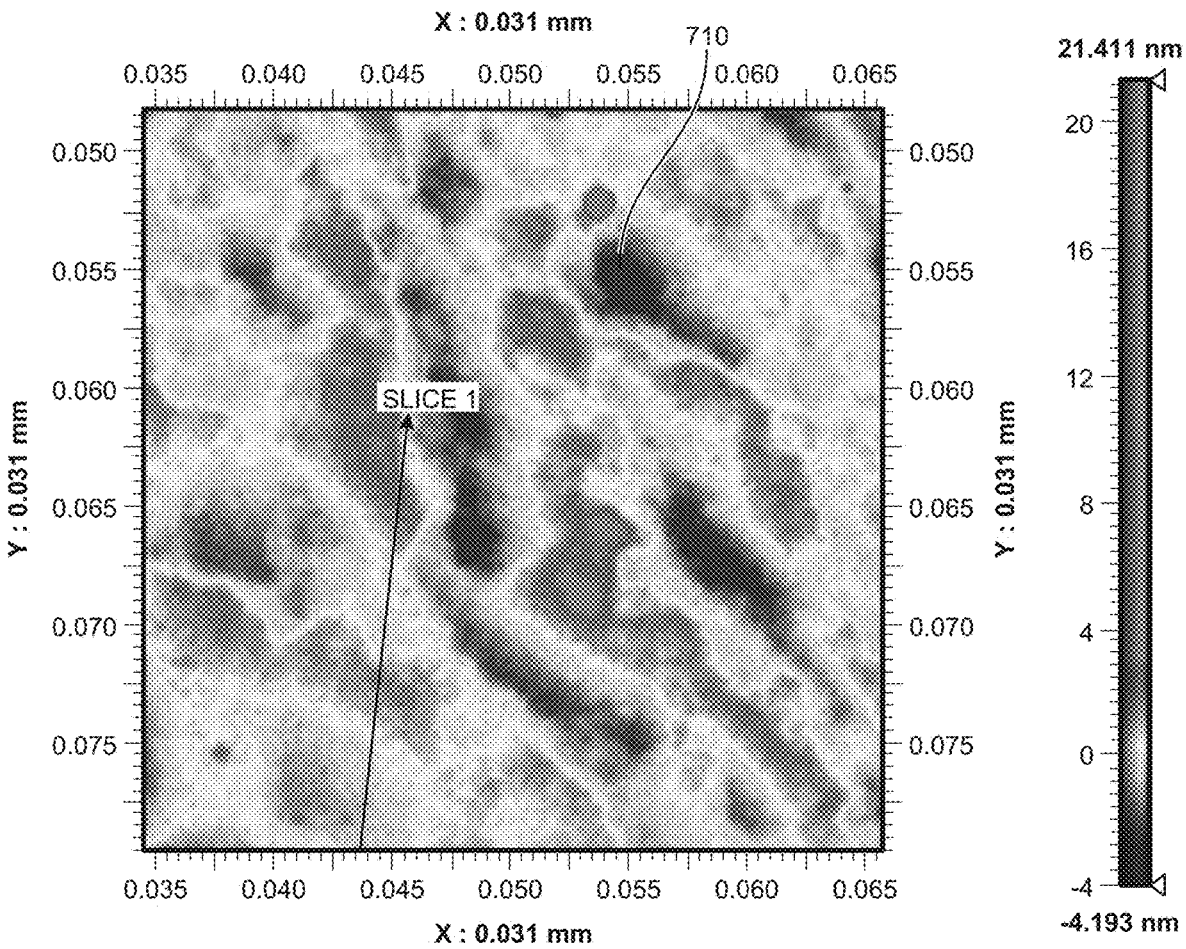

FIG. 7C shows an image 710 of the anthracene crystal 700 after planarization, showing only nanometer-scale surface profile irregularities. The surface roughness was evaluated along the line denoted Slice 1, and was found to have the surface roughness parameters $S_a$=0.89 nm (arithmetical mean height), $S_q$=1.21 nm (root mean square height), and $S_z$=24.60 nm (maximum height).

Figure 8:
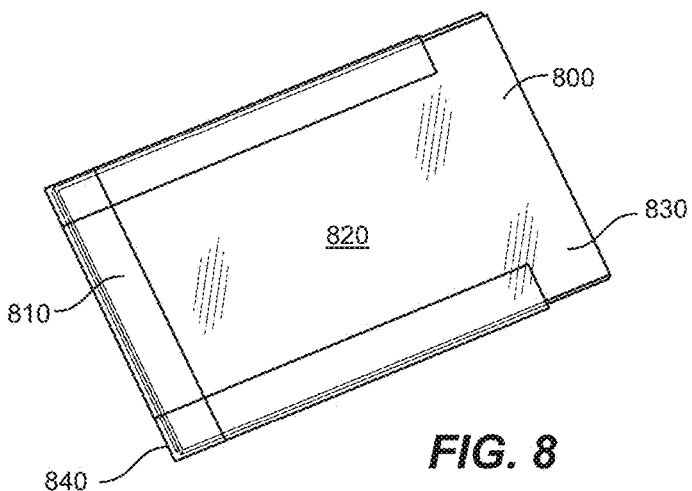
FIG. 8 shows an assembly including an organic solid (e.g., a planarized crystal) located in the gap between a pair of substrates according to certain embodiments.
Figures 9A, 9B, 9C, 9D:
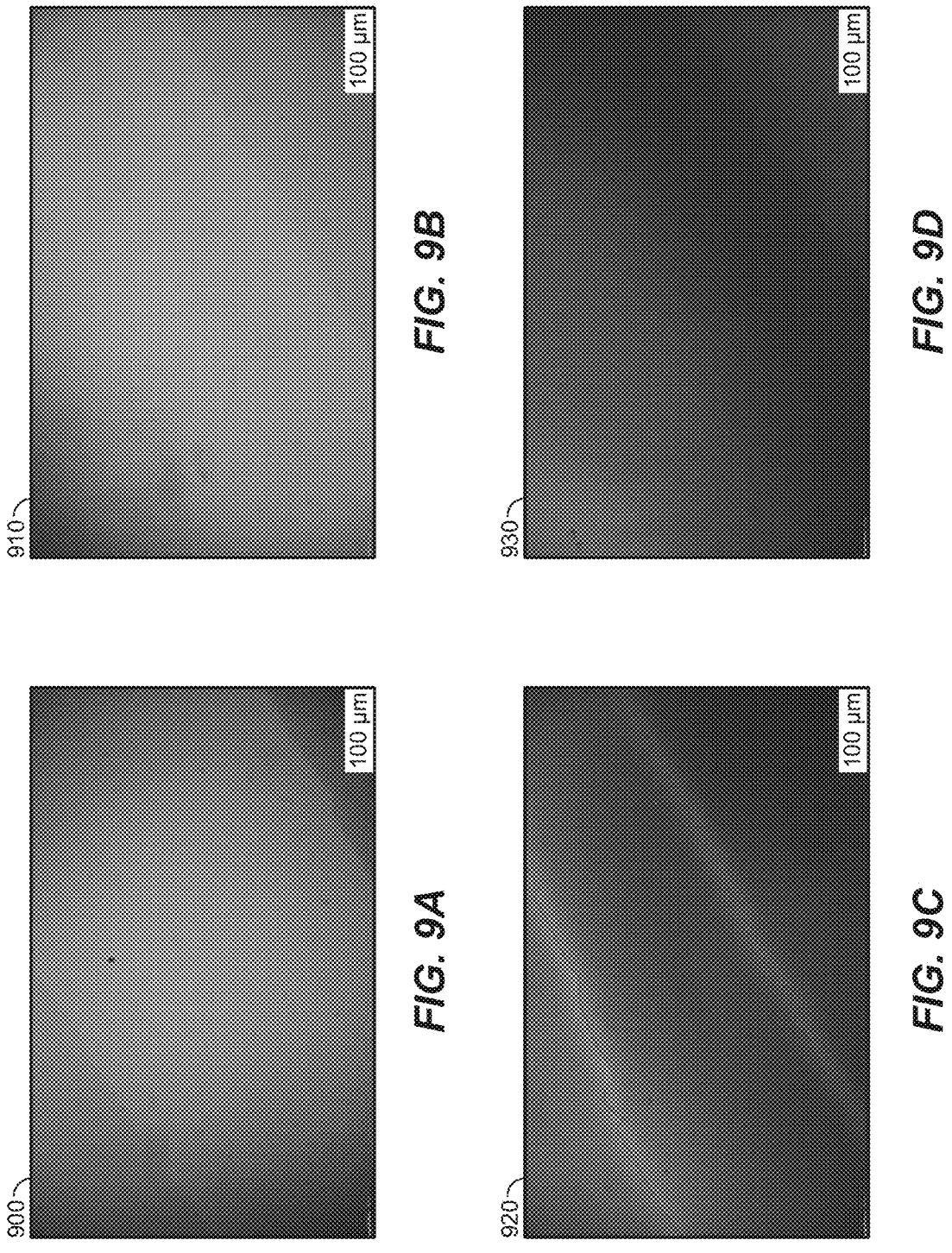
FIGS. 9A-9D show cross-polarized microscopy images of optical materials according to some embodiments.

FIG. 8 shows an assembly 800 including an organic solid (e.g., an organic crystal) located in the gap 820 between a pair of substrates including top substrate 830 and bottom substrate 840. The pair of substrates are separated by spacers 810 within an edge portion of the assembly 800. Example spacers may include polymer films, metal films, glass frits, or the like, and in some examples the substrates may have an interior surface profile that removes the requirement of spacers. In some examples, the spacers may include a polymer film and the spacer thickness may be approximately equal to or slightly greater than the thickness of the organic solid. In some examples, the spacers may not overlap each other.

The configuration shown in FIG. 8 may also be used for molding an optical element or a component thereof, for example, by molding an organic material into a desired form. The organic solid (e.g., an organic molecular crystal) may be heated to melt the organic crystal, allowing the organic crystal to fill the gap between two substrates having interior surfaces. In some examples, the interior surface of one or both substrates may be planar. In some examples, the interior surface of one or both substrates may be patterned, for example, to impart a surface pattern corresponding to a Fresnel lens into an organic solid. The gap between two substrates may be adjusted, for example, between 10 nm and 2 mm, such as between 10 nm and 500 microns. Zone annealing may be used to control (e.g., improve) crystallinity and orientation of the organic solid layer. For example, the temperature profile may be controlled to improve crystallinity and/or to obtain a desired crystal orientation. After fabrication, one or both substrates may be removed. In some examples, a patterned substrate may be removed and replaced with a non-patterned substrate, and any gap between the crystal and the substrate may be filled with air, an inert gas, or other filler material such as a liquid having a refractive index having an appreciable difference (e.g., at least 0.05, and in some examples at least 0.2) compared with the optical material. In some examples, one or more surfaces of an organic solid may have a surface profile imparted by an interior surface profile of the mold, for example, a surface profile associated with a Fresnel lens. In some examples, one or both substrates may have an alignment layer disposed on an interior surface of the substrate, such as a surface in contact with the optical material. An alignment layer may include a rubbed polymer, a photoaligned polymer (e.g., a polymer photopolymerized under polarized light), grating structure, other structure, layer of aligned molecules, or some combination of approaches. In some examples, a field (e.g., an electric field, magnetic field) or a shear deformation may be used to obtain molecular alignment.

FIGS. 9A-9D show cross-polarized microscopy images (900, 910, 920 and 930, respectively) of optical materials. In this case, the optical materials include an organic solid (anthracene) located between substrates, for example, in the configuration shown in FIG. 8. The figures show generally uniform refractive index profiles, indicating generally uniform organic solid thickness and/or generally uniform molecular orientation. In some examples, an optical element may include an organic solid, and in some examples, the organic solid may include uniformly aligned organic molecular crystals.

Figure 10A:
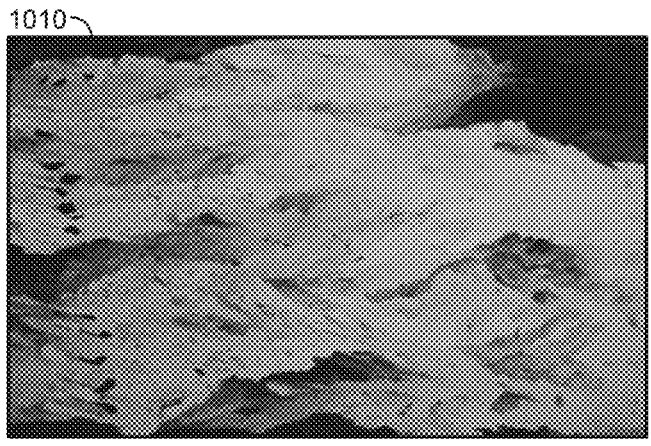
FIGS. 10A-10B show cross-polarized microscopy images of optical materials showing irregularities according to some embodiments.
Figure 10B:
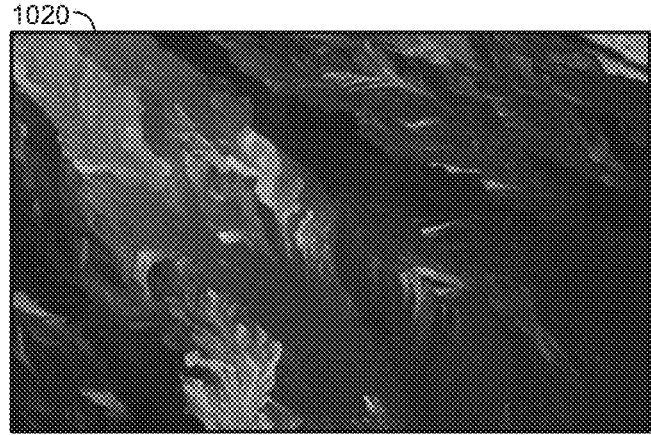

FIGS. 10A-10B show cross-polarized microscopy images 1010 and 1020 (respectively) of optical materials (in this case, organic solids) located between substrates, having a structure similar to that shown in FIG. 8, where the organic solids were formed by cooling from a liquid state in a mold formed by the substrates but without zone annealing. These images show visually discernable irregularities in crystal orientation and a somewhat polycrystalline nature of the optical materials formed.

In some examples, annealing of the optical material (such as zone annealing) may allow an improvement of crystal uniformity and corresponding optical properties. Annealing may allow control over crystal size and overall molecular orientational order. In some examples, zone annealing may allow the formation of temperature gradients that may facilitate uniform crystal growth. In some examples, orientational irregularities within an optical material may be optically identified (e.g., using polarized microscopy) and zone annealing may be used to reduce or eliminate the orientational irregularities. In some examples, zone annealing may use localized thermal heating, laser radiation (e.g., IR laser radiation) or other approach.

Optical Materials

In some examples, an optical element may include one or more optical materials. In some examples, an optical material may be generally transmissive at one or more wavelengths of electromagnetic radiation. For visual imaging applications, an optical material may be generally transmissive at one or more wavelengths of visible light, and may be generally transmissive for red, green, and/or blue light. For example, an optical material may be perceived as optically transparent by typical human vision. In some examples, an optical material may include one or more aromatic groups, such as one or more phenyl groups, or other ring structures.

FIGS. 11A-11T show example molecular structures that may be used to form optical materials. Example molecules may include organic molecules such as those illustrated, and their derivatives, analogs, and reaction products.

In these and other examples describe herein, the symbol R may represent one or more substituent groups located at one or more suitable locations around the molecule. For example, one or more hydrogen atoms may be replaced (e.g., substituted) with corresponding substituent groups. In some examples, a substituent group may be or include; an alkyl group (e.g., a branched or straight chain alkyl group), an alkyloxy group, a halogen, an aromatic group (e.g., a phenyl group, other aromatic carbon ring, or heterocycle), a sulfur-containing group (e.g., a sulfate, thiol or thioalkyl group), nitrogen-containing group (e.g., amine, amide or nitrile group), sulfur-containing group (e.g., a thio or mercapto group), or other oxygen-containing group (e.g., an ester or other group). In some examples, R may represent or include one or more of the following groups; $CH_3$ (methyl), H, OH, OMe (methoxy), OEt (ethoxy), OiPr (isopropoxy), F, Cl, Br, I, Ph (phenyl), t-Bu (tert-butyl), sec-Bu, Et (ethyl), acetyl, SH, SMe, carboxyl, aldehyde, amide, nitrogen, nitrile, ester, sulfate, $SO_2NH_3$, $SO_2NH_2$, $NH_2$, $NMe_2$, NMeH, or $C_2H_2$.

In some examples, a substituent group may include one or more electron withdrawing and/or electron donating groups. A substituent group may be located at any position where the molecular structure could be substituted to any one of these example substituent groups. If a molecule includes a plurality of substituent groups, these may be denoted $R_1$, $R_2$, $R_3$, $R_4$ etc. If a molecule includes a plurality of substituent groups, the substituent groups may be the same or different. If an optical material includes an example substituted molecule, the substituents of component molecules may be the same or different. An example optical material may include one or more chemical species. Example optical materials may include one or more molecular structures that may each include one or more substituent groups, and the substituent groups may the same or different. An optical material, such as an organic solid, may include one or more example molecular structures, and may include one or more substituted versions of any particular example molecular structure (e.g., including a number of different molecular chain lengths as substituents to the same core structure).

In relation to specific illustrated examples, FIGS. 11F, 11H and 11C show (respectively) molecules including 2, 3 and 4 fused aromatic rings (in these examples, benzene rings) in a linear arrangement, such as naphthalene, anthracene and tetracene. Examples may also include molecules with one or more additional aromatic rings, such as pentacene. FIG. 11E illustrates benz(a)anthracene and helps illustrate through these representative examples that molecules having fused aromatic rings may have linear or non-linear arrangements of aromatic rings. Examples may also include derivatives, substituted molecules, and reaction products of these and any other molecules. For example, anthraquinone (e.g., as illustrated in FIG. 11D) is a possible reaction product of the oxidation of anthracene (FIG. 11H). FIGS. 11I, 11J and 11K illustrate examples including fused aromatic rings, where the fused rings include a benzene ring and a heterocycle. Example heterocycles may include nitrogen, sulfur and/or oxygen containing heterocycles. FIGS. 11G, 11L, 11M, 11N, 11O, 11P, 11S and 11T illustrate various example molecular structures including a single aromatic ring. Examples may include benzene, aniline, phenol, anisole, benzenethiol, thioanisole, uracil, benzamide, and derivatives, analogs, and reaction products of these and any other examples.

Figure 12A:
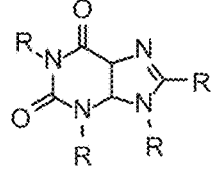
Figure 12B:
Figure 12C:
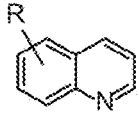
Figure 12D:
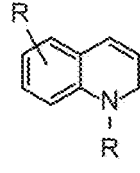
Figure 12E:
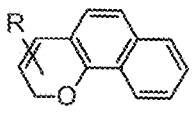
Figure 12F:
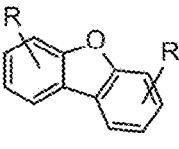
Figure 12G:
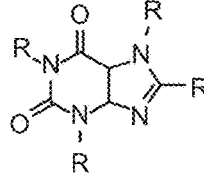
Figure 12H:
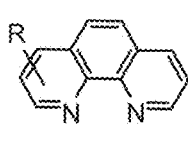
Figure 12I:
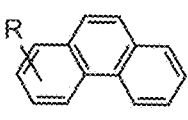
Figure 12J:
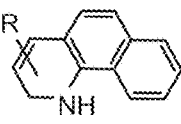
Figure 12K:
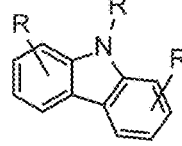
Figure 12L:
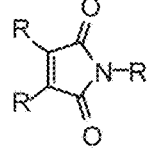
Figure 12M:
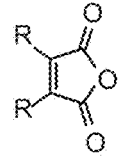
Figure 12N:
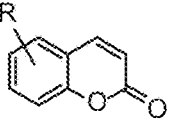
Figure 12O:
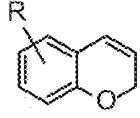
Figure 12P:
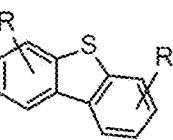
Figure 12Q:
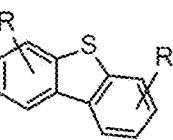
Figure 13I:
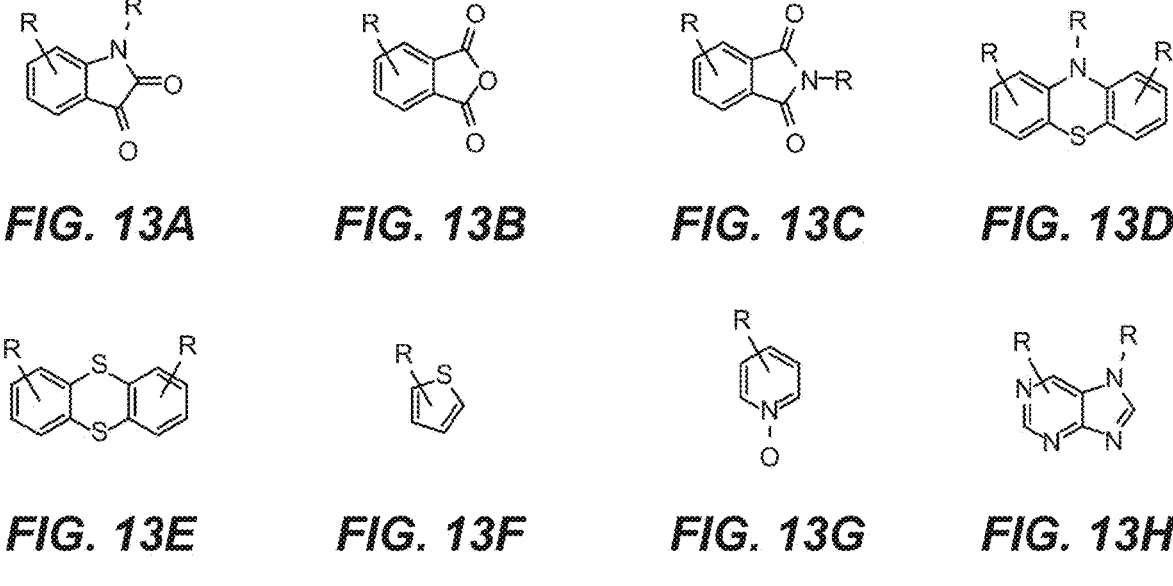

FIGS. 12A-12Q illustrate further molecular structure examples. Example molecular structures may include heterocycles including one or more of oxygen, nitrogen or sulfur. Example heterocycles may include one or more oxygen atom, one or more nitrogen atom, and/or one or more sulfur atom, or any combination thereof.

FIGS. 13A-13I illustrate further molecular structure examples. Examples molecular structures may include heterocycles including one or more of oxygen, nitrogen or sulfur. Example heterocycles may include one or more oxygen atom, one or more nitrogen atom, and/or one or more sulfur atom, or any combination thereof.

FIGS. 14A-14D illustrate various substituted anthracene molecules. These examples further illustrate that the indicated substituent group R (e.g., as shown in FIG. 11H) may indicate one or more substituent groups on one or more rings. For example, FIG. 14A shows an anthracene molecule with a methyl substituent group. FIG. 14B shows a methyl substituent group on a first ring and two hydroxyl substituent groups on a second ring. FIG. 14C shows a fluoro substituent on one ring and two hydroxyl substituent groups on a second ring. FIG. 14D shows two hydroxyl substituent groups on the central ring. All of these molecular structures, and many others, are represented by the general substituted anthracene structure shown in FIG. 11H.

FIGS. 15A-15H illustrate further molecular structure examples. The illustrated structures may represent enantiomerically pure materials of any handedness, racemic mixtures, or any combination of optical isomers.

Figures 16A, 16B, 16C, 16D, 16E, 16F, 16G, 16H, 16I, 16J, 16K, 16L, 16M:
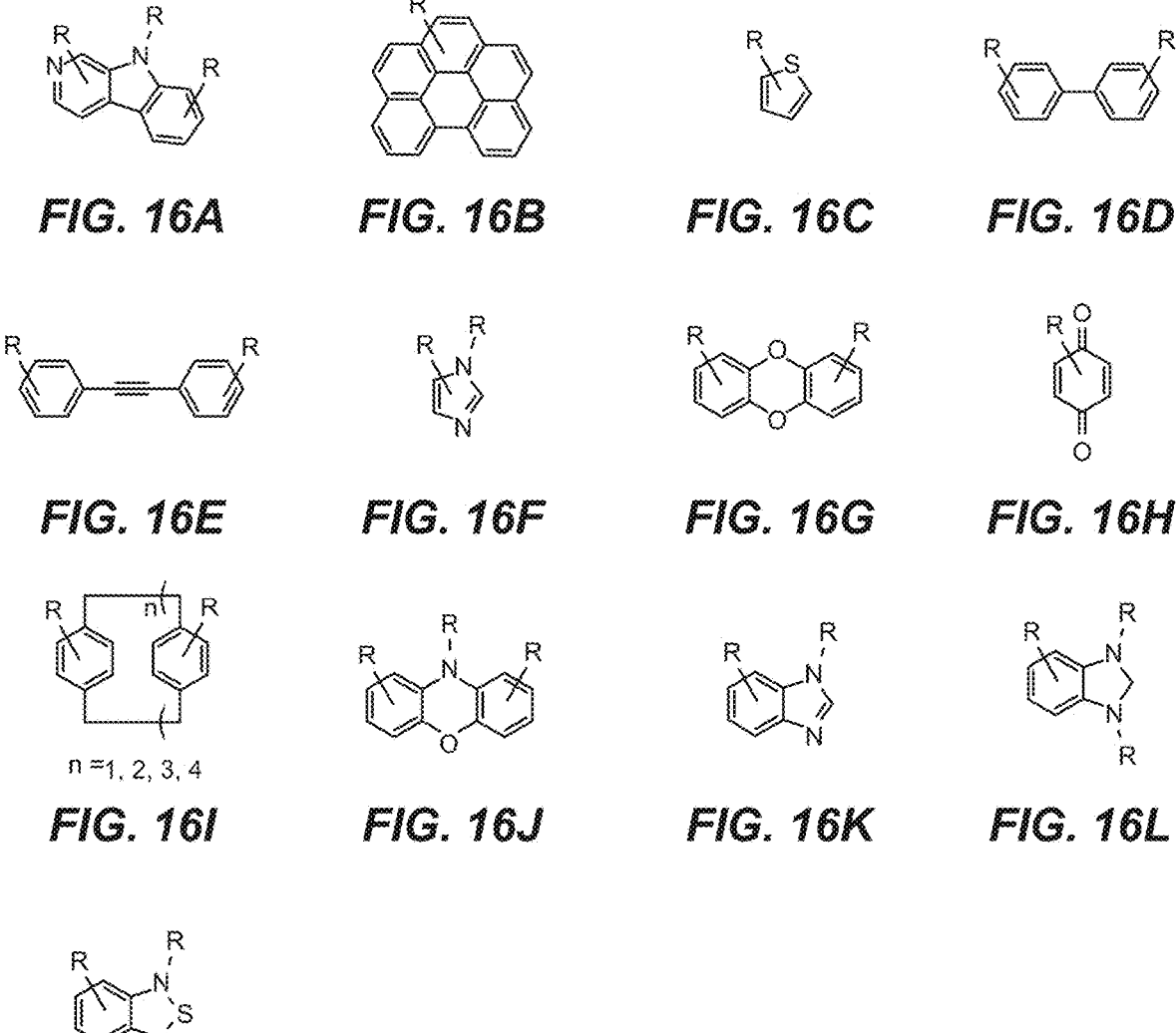
Figure 17A:
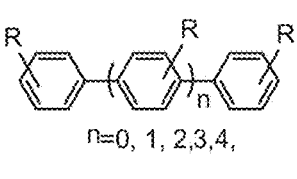
Figure 17B:
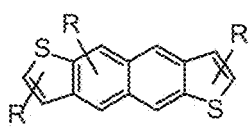
Figure 17C:
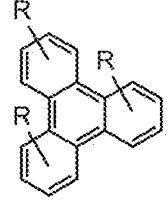
Figure 17D:
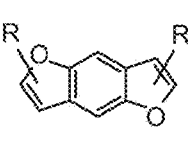
Figure 17E:
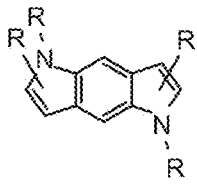
Figure 17F:
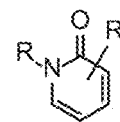
Figure 17G:
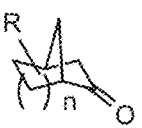

FIGS. 16A-16M illustrate further molecular structure examples. In FIG. 16I, n may be any positive integer (e.g., n=1, 2, 4, 5, or other positive integer). This example shows that example molecular structures may include cyclic arrangements of ring structures, such as aromatic ring structures.

FIGS. 17A-17G illustrate further molecular structure examples. For example, FIG. 17A may represent polyphenyl structures such as biphenyl, terphenyl, and structures including 4 or a greater number of rings. The structures represented by FIG. 17A may further include various nematogens, smectogens, and the like. For example, examples of the structure of FIG. 17A include substituted biphenyls and terphenyls such as the alkylcyanobiphenyls and alkyloxycyanobiphenyls, various particular examples of which may form thermotropic nematic and/or smectic phases such as smectic A phases.

In some examples, a molecular structure may include an aromatic core including 1-3 ring structures, a polar group (e.g., a halogen, cyano, or other polar group), and an alkyl, alkyloxy or alkene chain including between 1-10 carbon atoms. The structures represented by FIG. 17C may include molecules that form a thermotropic discotic nematic liquid crystal phase, for example, example structures including the illustrated aromatic core and one or more alkyl or other chain group substituents.

Figure 18A:
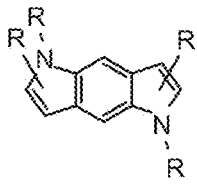
Figure 18B:
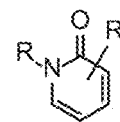

FIGS. 18A and 18B illustrate further molecular structure examples. The illustrated structures may represent enantiomerically pure materials of any handedness, racemic mixtures, or any combination of optical isomers.

Figures 19A, 19B, 19C, 19D, 19E, 19F, 19G, 19H, 19I, 19J, 19K, 19L, 19M, 19N:
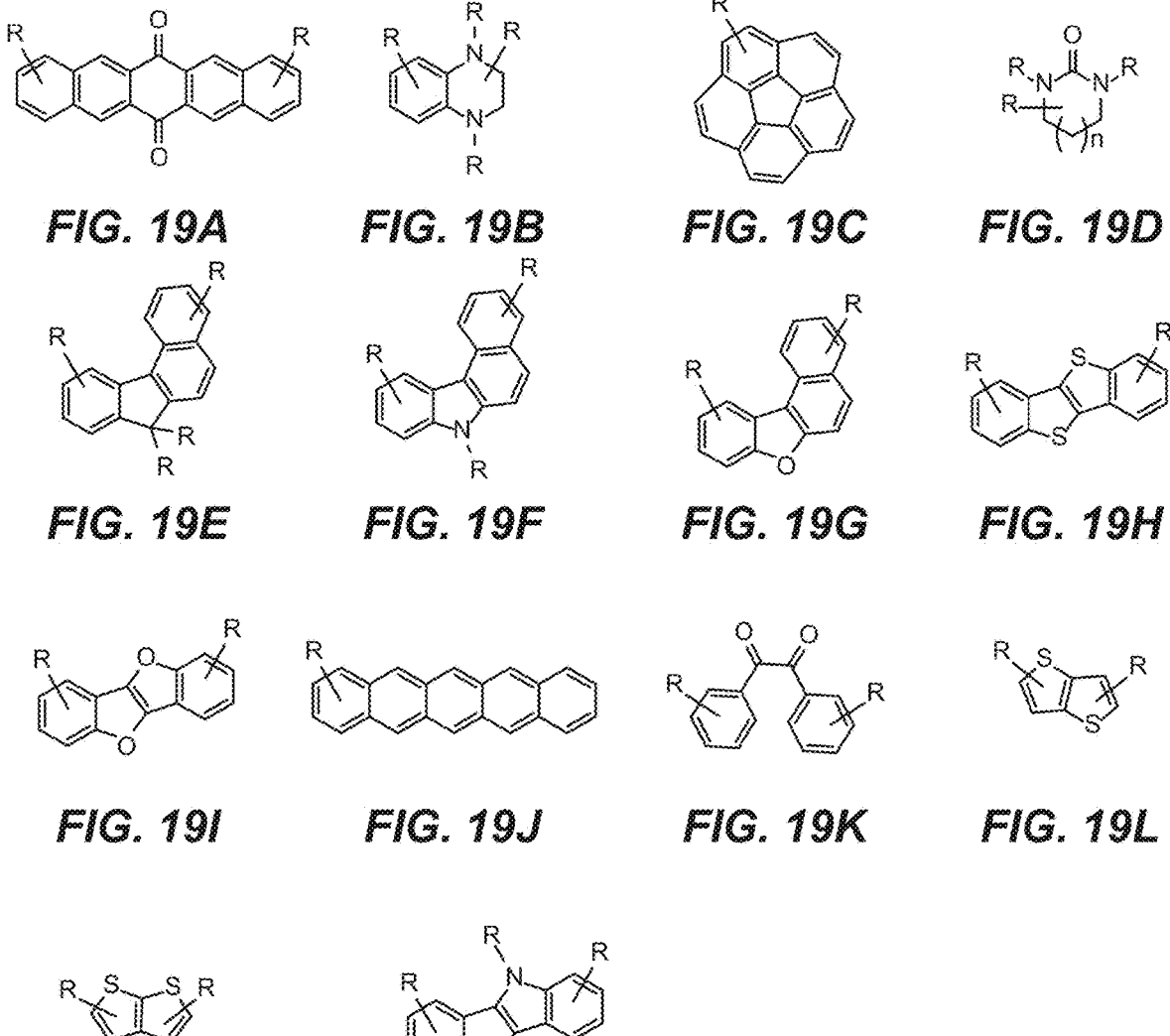

FIGS. 19A-19N illustrate further molecular structure examples. The structures illustrated by FIG. 19C may include molecules that form a thermotropic discotic nematic liquid crystal phase.

Figure 20I:
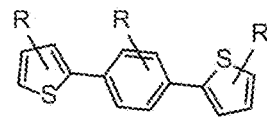
Figures 30A, 30B, 30C, 30D, 30E, 30F, 30G, 30H:
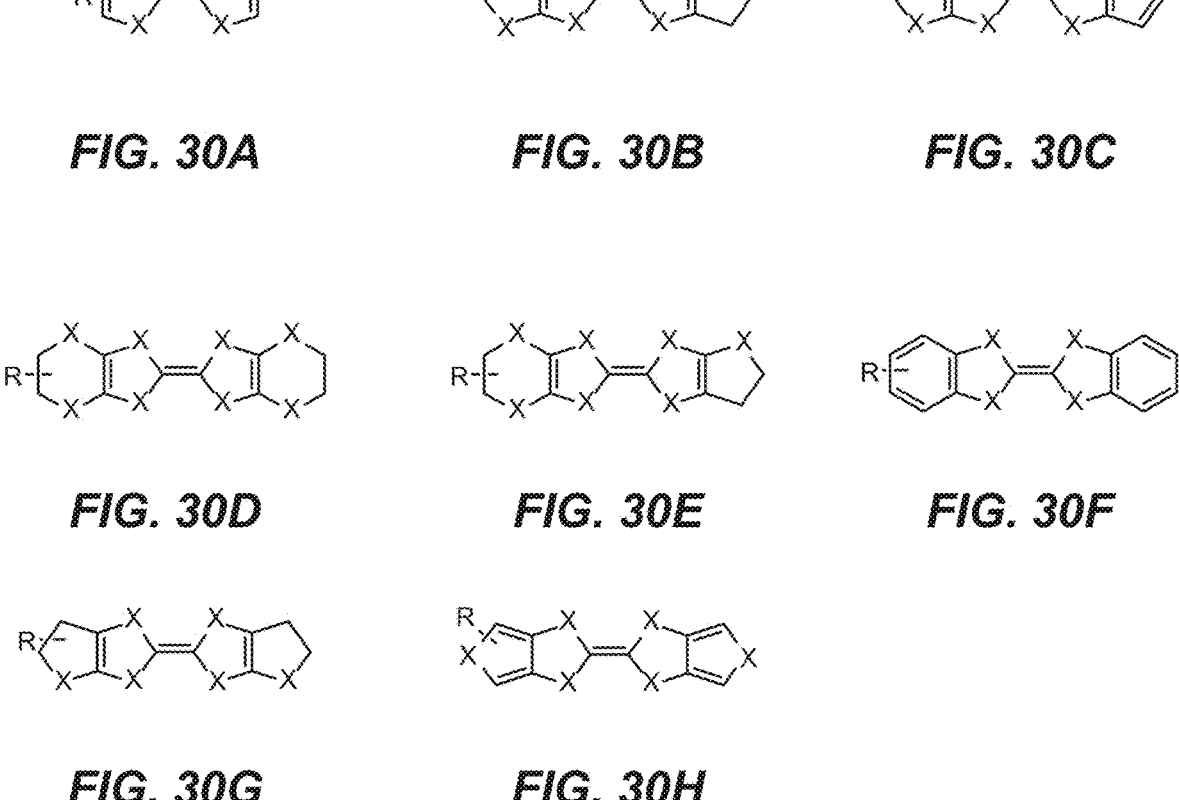
Figure 31A:
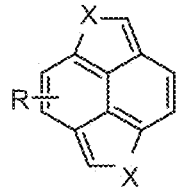
Figure 31B:
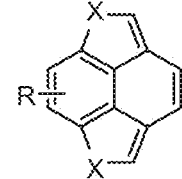
Figure 31C:
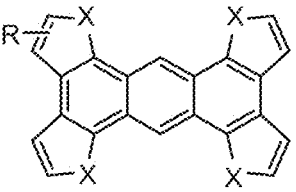
Figure 31D:
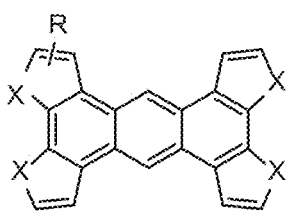
Figure 31E:
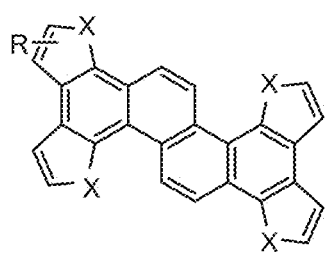
Figure 31F:
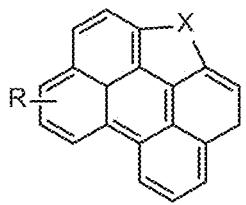
Figure 31G:
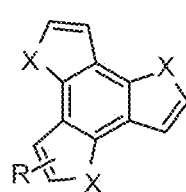
Figure 31H:
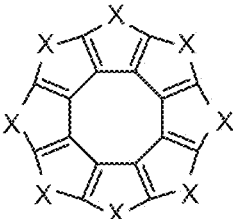
Figure 31I:
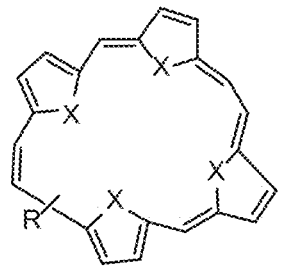

FIGS. 20A-20I illustrate further molecular structure examples. FIG. 20A represents, for example, substituted alkenes. Illustrated examples (e.g., FIGS. 20E, 20H, and 20I) may include heterocycles, such as sulfur-containing aromatic heterocycles.

FIGS. 21A-21D illustrate further molecular structure examples. In some examples, the illustrated molecular structures may be used as electron withdrawing groups or electron donating groups within a larger molecular structure (e.g., using other example structures, a polymer, or other additional molecular component).

Example optical materials may include molecules having an electron donor—bridge group—electron acceptor structure. The examples of FIGS. 20-20I include groups that may be used as the bridge structure. The examples of FIGS. 21A-21D illustrate possible example electron donor and electron acceptor groups.

In some examples, an optical material may include an organic salt. An organic salt may include a positive ion and a negative ion, where at least one of the positive ion or negative ion is an organic structure. The other ionic component may be organic or non-organic.

FIGS. 23A-23I illustrate further molecular structure examples. These examples may be used, for example, as negative ions in an ionic molecular solid. Additional examples may include halogens (e.g., F—, Cl—, Br—) or other negatively charged ions.

FIGS. 24A-24K illustrate further molecular structure examples. These examples may be used, for example, as positive ions in an ionic molecular solid. In FIG. 24G, n may be zero or a positive integer, such as an integer between 0 and 10 inclusive, such as 0, 1, 2, 3 or 4. Additional examples include alkali metal ions (e.g., the positive ions $Li^+$, $Na^+$ or $K^+$), alkali earth metal ions (e.g., $Be^{2+}$, $Mg^{2+}$ or $Ca^{2+}$), or other positive metal ions (e.g., ions of Mg, Al, etc.) such as transition metal ions in one or more oxidation states (e.g., $Fe^{2+}$, $Fe^{3+}$).

FIG. 25 illustrates further molecular structure examples, for example, where n may be zero or a positive integer, such as an integer between 0 and 10 inclusive, such as 0, 1, 2, 3 or 4. In some examples, the illustrated structures may include an open or closed ring. The illustrated structures may represent enantiomerically pure materials of any handedness, racemic mixtures, or any combination of optical isomers.

FIGS. 26A-26D illustrate further molecular structure examples. In FIG. 26C, n may be zero or a positive integer, such as an integer between 0 and 10 inclusive, such as 0, 1, 2, 3 or 4. Examples include diacid structures and esters thereof. Example molecular structures may include one or more acid groups, such as carboxylic acid groups, and may include salts, esters (or analogous structures) or other derivatives thereof.

FIGS. 27A-27C illustrate further molecular structure examples. R may represent one or more substituent groups as previously discussed. X may represent a ring heteroatom (such as an atom other than carbon). For example, X may be S, Se, Te, N, NH, N—R, or O). Various example locations of X may correspond to the same or different heteroatoms. R may include further ring structures that may be the same or different. In this and other examples, an R group discussed herein may include derivatives of the example R groups discussed, such as an example R group further substituted with the same or different R group. Hence, R groups may include repeating groups. For example, in FIGS. 27A-C, n may be 1-5, and the structure may include arrangement so of the illustrated ring structures.

FIGS. 28A-28H illustrate further molecular structure examples.

FIGS. 29A-29K illustrate further molecular structure examples. X may represent a ring heteroatom or a group including a ring heteroatom, such as an atom other than carbon. For example, X may represent S, Se, Te, N, N—H, N—R, or O. Various example locations of X may correspond to the same or different heteroatoms. In some examples, a ring heteroatom may be attached to one or more substituent groups and/or hydrogen atoms. The indicated linker shown in several examples (e.g., FIG. 29D, 29E or 29F) may correspond to any suitable connection, such as a bond (e.g., carbon-carbon bond), alkyl, alkene or alkyne connection.

FIGS. 30A-30H illustrate further molecular structure examples. X may represent a ring heteroatom (such as an atom other than carbon). For example, X may be S, Se, Te, N, NH, N—R, or O). Various example locations of X may correspond to the same or different heteroatoms.

FIGS. 31A-31I illustrate further molecular structure examples. X may represent a ring heteroatom (such as an atom other than carbon). For example, X may be S, Se, Te, N, NH, N—R, or O). Various example locations of X may correspond to the same or different heteroatoms.

FIG. 32 illustrates a schematic structure of a side chain polymer material 3200 in which molecular moieties (e.g., moiety 3210 and moiety 3212) may be connected by linker groups 3220 to a polymer backbone 3230. Molecular moieties may be the same or different. In some examples, the molecular moieties may include prolate and/or oblate spheroidal structures such as those discussed above, for example, in relation to FIGS. 11A-31I. Examples may include a linker group attached to the molecular moiety and optionally other substituent groups. The polymer chain and/or linker groups may be flexible. Any suitable polymer chain may be used, such as an acrylate, polyethylene, polypropylene, polysiloxane, or other polymer chain.

FIG. 33 schematically illustrates an optical material 3300 including molecular moieties having an oblate spheroid form (in some examples, disk-shaped form), The molecular moieties 3310 may be interconnected by linker groups (e.g., linker groups 3320 and 3322). The linker groups may include molecular chains (e.g., carbohydrate chains with 1-20 carbon atoms). The linker groups may help stabilize the molecular alignment within an optical material. In some example, an optical material may include molecular moieties 3330 unconnected to other molecular moieties. The molecular moieties may include prolate and/or oblate spheroidal structures, such as those discussed above, for example, in relation to FIGS. 11A-31I.

In some examples, an optical material may be polymerized and/or cross-linked after alignment of molecular moieties. An optical material may include a polymerizable species, and the polymerizable species may be polymerized after alignment of molecules and/or molecular moieties (e.g., polymer side chain groups) within the optical material. In some examples, after polymerization of the polymerizable material, an optical material may include a polymer network configured to stabilize an aligned structure. In some examples, photopolymerization and/or photo-induced cross-linking may be used to stabilize organic solids after formation of the desired shape of an optical element (e.g., a lens).

In some examples, molecular moieties may be interconnected to polymer backbones and/or to each other, and in some examples linker groups may be formed by a reaction of material components that may occur before, during, or after formation of an optical element from an optical material such as an organic solid.

In some examples, an organic solid may include an organic molecular species, where the organic molecular species includes at least two aromatic ring structures. The organic solid may include aligned organic molecules, for example, having at least a degree of orientational order and/or a degree of positional order. As discussed above, example molecular materials may include biphenyls, terphenyls, and other polyphenyls.

Methods of Fabrication of Optical Elements

Optical elements, such as lenses, may be fabricated using a patterning method, such as material extraction (e.g., etching, ablation, mechanical material removal, or other patterning approaches) or a molding method.

In some examples, an optical element may be fabricated using a molding method, for example, with pattern transfer to the surface of an optical element using a mold. In some examples, a molecular solid may be melted or otherwise softened before molding, for example, by heating. Heating may be under an inert atmosphere. In some examples, a mold may be formed using one or more patterned substrates to obtain a desired surface profile in the optical element (e.g., to obtain a Fresnel lens, micro-lens array, grating, convex or concave refractive lens, or the like).

The surface roughness of an optical material sample may be reduced before patterning, for example, using a planarization method to provide an optical material having a generally planar surface. Examples include mechanical polishing (e.g., methods to mechanically remove excess parts of organic solid crystals, including diamond turning, lapping, ion milling, etching, polishing, or other planarization approaches). Polishing approaches may include chemical and/or mechanical polishing, or a combination of mechanical and chemical approaches to remove excess part of organic solid crystals. A mechanical abrasive or polishing method may be combined with any etching approach, such as chemical or physical material removal, and physical and/or chemical approaches may be used to planarize a surface.

For example, an optical material may be grown in a mold (or on a substrate) providing a Fresnel lens pattern. After removal from the mold, the optical material may have the Fresnel lens pattern formed on one surface. The other surface may be planarized or otherwise patterned. Molding approaches may include crystal formation with at least one surface of the crystal in contact with a medium that allows surface roughness and/or surface profile control. An example medium may include (but not limited to) a polymer, inorganic glass, inorganic crystal, a fluid, or other medium.

A process of forming a lens including a uniaxial or biaxial organic solid materials may include one or more of thermal molding, thermal imprinting, and patterning and etching. Thermal molding and thermal imprinting methods may utilize a mold surface having a pattern that is an inverse reciprocal structure to the lens structure to be formed. A suitable architecture for patterning and etching may include a planar or non-planar structure.

In some examples, a method of fabricating an optical element may include introducing an organic liquid into a mold, and solidifying the organic liquid into an organic solid to form the optical element. An optical element may include a lens (e.g., a Fresnel lens or a lens array), a prism, a grating, a waveguide, a substrate, a window. In some examples, an optical element may be a component of an optical component such as a laser, light-emitting diode, or the like. In some examples, the optical element includes a Fresnel lens and at least one surface of the organic solid may include a plurality of facets. The organic solid may have optical anisotropy (e.g., may be uniaxial or biaxial). The direction of a maximum refractive index of the organic solid may be aligned substantially orthogonal to an optical axis of the lens. In this context, the direction of maximum refractive index may be the higher refractive index of a uniaxial solid, for example, determined at a given temperature or wavelength.

In some examples, an optical element may be molded between a pair of substrates. In some examples, for example, as shown in FIG. 8, the substrates may be separated by spacers that help define a gap region between the substrates. The interior surface profiles of the substrate, and hence the interior profile of gap region may help define the shape of an optical element. For example, a substrate including an arrangement of concave depressions may be used to fabricate a lens array, such as a micro-lens array. A substrate including a triangular profile shaped depression may be used to fabricate a prism. In some examples, the interior substrates may be generally planar, allowing a planar disk of organic solid to be fabricated. A surface profile may be introduced to form a Fresnel lens. In some examples, at least one substrate may have an interior profile configured to introduce an arrangement of facets into an optical element to form a Fresnel lens.

In some examples, a method of fabricating an optical element may include forming a patterned surface profile in an organic solid to form the optical element. For example, an organic element may be formed (e.g., molded or otherwise fabricated) into the form of a plate (e.g., a rectangular plate or disk) having opposed parallel planar surfaces. In some examples, at least one surface may be patterned to form a Fresnel lens. The organic solid may be optically anisotropic (e.g., uniaxial or biaxial), and the Fresnel lens may be fabricated to have an optical axis that is orthogonal to a direction of a maximum refractive index of the organic solid.

In some examples, at least a portion of an example lens may be rotationally symmetric about the optical axis. In some examples, a light beam traveling along an optical axis of an example lens may not be deviated by the lens. In some examples, alternating steps and facets of an example Fresnel lens may encircle an optical center of the lens, through which the optical axis may pass.

In some examples, a method of fabricating a Fresnel lens includes fabricating an optical material in the form of an optically anisotropic solid layer, planarizing at least one surface of the solid layer, and fabricating a plurality of steps and facets in at least one surface of the solid layer to form a Fresnel lens. In some examples, the Fresnel lens may be configured to receive a light beam along a beam direction at least approximately perpendicular to the direction of highest refractive index. In some examples, the Fresnel lens may have at least one planar surface and the optical material may have a direction of highest refractive index at least approximately parallel to the planar surface.

FIG. 34 illustrates an example method of fabrication of an optical element. The method (3400) includes fabricating an optical material (3410) in the form of an optically anisotropic solid having a direction of highest refractive index, and forming the optical element (3420) using the optically anisotropic solid. The optical element may be configured to receive a light beam along a beam direction at least approximately perpendicular to the direction of highest refractive index. In some examples, the direction of highest refractive index may be perpendicular to an optical axis.

FIG. 35 illustrates an example method of fabrication of a lens. The method (3500) includes fabricating an optical material (3510) in the form of an optically anisotropic organic solid, forming at least one refractive surface in the optically anisotropic solid (3520), and fabricating the optical element (3530) using the optically anisotropic solid. The optical element is configured to receive a light beam along a beam direction at least approximately perpendicular to the direction of highest refractive index. A refractive surface may include a curved surface and/or a surface that is oblique to incident light. In some examples, a refractive surface may be oblique (e.g., non-normal) to a light beam propagating along an optical axis of the optical element (as appropriate). For example, an optical element such as a lens may have an optical axis through the center of the optical element, and the direction of maximum refractive index may be perpendicular to the optical axis.

FIG. 36 illustrates an example method of fabrication of an optical element, such as a lens, such as a Fresnel lens. In some examples, a method (3600) may include introducing an organic liquid into a mold (3610), and solidifying the organic liquid into an organic solid to form the optical element (3620), such as a Fresnel lens. The mold may impart a desired surface profile into at least one face of the optical element. In some examples, at least one surface of the organic solid may include a plurality of facets. In some examples, at least one surface may be planarized. In some examples, a planarized surface may be further processed (e.g., by etching) to provide a desired surface profile. The organic solid may have optical anisotropy, and a direction of a maximum refractive index of the organic solid may be aligned substantially orthogonal to an optical axis of the optical element, or parallel to a planar light receiving and/or parallel to a planar light emitting surface, as appropriate.

In some examples, a Fresnel lens may be configured to receive a light beam along a beam direction at least approximately perpendicular to the direction of highest refractive index. In some examples, the Fresnel lens may have at least one planar surface and the optical material may have a direction of highest refractive index at least approximately parallel to the planar surface.

The methods described herein, such as those discussed above in relation to FIGS. 34-36, may further include aligning the orientation of molecules and/or molecular moieties within the optical material. Alignment may include application of a field (e.g., an electric field, a magnetic field, an electromagnetic field such as laser radiation, or an acoustic field where this term also includes ultrasound radiation fields), mechanical processing (e.g., stretching, compression or expansion along one or more directions), molecular alignment along surface features (e.g., grooves, rubbed or otherwise oriented polymer films), flow effects, shear forces (e.g., between substrates, such as shear forces resulting from rotational and/or linear displacements between substrates), or molecular alignment along any suitable alignment layer. In some examples, a substrate may include or support an arrangement of electrodes, such as interdigitated electrodes, that may be used to apply an electric field to the optical material. In some examples, a field (e.g., an electric field, a magnetic field, and/or a vibrational field such as acoustic or ultrasound radiation) and/or other alignment method may be used to align a molecular fluid (e.g., a liquid crystal) as the molecular fluid cools, for example, into a solid phase. Field-based orientation (such as liquid crystal alignment and/or poling) may be combined with other alignment methods such as, for example, use of a surface alignment layer on a surface of a mold. Alignment methods of any type or combination may be combined with molding, for example, molding of facets and/or steps onto at least one surface of a Fresnel lens.

Molecular alignment may be achieved in a fluid phase, and the molecular alignment may then be locked in (e.g., made stable for normal operational use) using one or more approaches such as polymerization, cross-linking, formation of an alignment-stabilizing polymer network within the material, formation of more ordered phases (e.g., a smectic phase), cooling the material down through a glass transition temperature, or cooling the material to form a crystalline or amorphous solid. In some examples, molecular alignment may be achieved at an elevated temperature, such as greater than 50 degrees C.

In some examples, a lens including a high index organic solid material may be formed via a thermal growth method using a mold having a predetermined shape, i.e., texture, structure, thickness, curvature, etc. According to further examples, patterning, and imprinting or etching techniques may be used to form a lens following a process of molding a lens blank. As will be appreciated, a process of molding an optically anisotropic crystalline or partially crystalline thin film may include operational control of the kinetics and thermodynamics of nucleation and crystal growth.

In some examples, a temperature during molding proximate to a nucleation region of a mold may be less than a melting temperature ($T_m$) of a molding composition, while the temperature remote from the nucleation region may be greater than the melting temperature. Such a temperature gradient may be obtained through a spatially applied thermal gradient, optionally in conjunction with a selective melting process (e.g., laser, soldering iron, etc.) to remove excess nuclei, leaving few nuclei (e.g., a single nucleus) for crystal growth.

Crystal growth may be controlled using an isothermal process, slow cooling, and/or zone annealing. Zone annealing may be used to improve the uniformity of molecular alignment within an organic solid.

In some examples, a lubricant may be used to encourage the growth of a single crystal. Example lubricants may include polymers, oligomers, or small molecules. Example lubricants may be characterized by a melting temperature that is at least 20° C. less than, for example, 20° C., 30° C., or even 40° C. less than, the melting temperature of the molding composition. In some examples, a molecular crystal may be grown on a substrate having a lubricant layer disposed in the crystal surface. In some examples, a mold may be formed from a pair of opposed substrates and at least one interior surface of the pair of substrates (e.g., a surface in contact with the cooling molecular material) may have a lubricant layer on the surface. In some examples, a substrate on which a molecular crystal is grown may be coated with at least one lubricant.

In some examples, a suitable mold may be formed from a polymer having a softening temperature or a glass transition temperature ($T_g$) greater than the melting temperature ($T_m$) of the molding composition. If the mold includes a pair of opposed substrates, at least one of the pair of substrates may include a polymer.

In some examples, a releasing agent, for example, a material including one or more of fluorinated groups, silicones, hydrocarbon chains, etc., may be applied to an internal surface of the mold and/or combined with the molding composition. Additional materials may be applied to an internal surface of the mold to decrease interactions between the mold and the molding composition. A surface treatment of an inner surface of the mold may include the chemical bonding or physical absorption of small molecules, or polymers/oligomers having linear, branched, dendritic, or ringed structures, that are functionalized, for example, with fluorinated groups, silicones, or hydrocarbon groups.

In some examples, an optical element may be (or include) a lens (e.g., a refractive or diffractive lens), a prism, a window, a waveguide, a mirror, a prism, a diffraction grating (or other diffractive element), a Bragg reflector, an optical fiber, or other optical element. In some examples, a lens may be or include a Fresnel lens. Examples discussed herein include examples directed towards lenses and their fabrication, but similar device configurations and methods may be readily adapted to the configuration and fabrication of other optical elements.

In some examples, an optical element or component thereof (e.g., a lens, window, grating, prism, substrate, and the like) may include a uniaxially-oriented or a biaxially-oriented solid material such as a crystalline, semi-crystalline, or amorphous solid material. The solid material may include an organic material and/or a molecular material. In some examples, the solid material may be an organic crystal and/or a molecular crystal. In some examples, the solid material may be optically anisotropic, having a direction of maximum refractive index. In some examples, an optical element such as a lens may have an optical axis, and the direction of maximum refractive index of the solid material may be substantially orthogonal to an optical axis of the optical element. In some examples, an optical element may be configured as a Fresnel lens, and the optical element may further include a plurality of facets disposed at a surface of the lens.

In some examples, a lens may include a uniaxially-oriented or a biaxially-oriented solid material, such as an organic solid material and/or a molecular solid material. The lens may include, for example, a Fresnel lens or a prismatic lens. The solid material may be a constituent of a body of the lens and/or may be used to provide a plurality of facets located at a surface of the lens.

In some examples, an optical element such as a lens including a high refractive index and/or birefringent solid crystalline material may improve the optical resolution of the lens. In some examples, the direction of a maximum refractive index of the solid material (e.g., an organic solid material) may be aligned substantially orthogonal to an optical axis of the optical element (e.g., a lens), and/or orthogonal to a beam direction of a light beam propagating through the optical element.

In some examples, a lens may include a uniaxially-oriented or a biaxially-oriented organic solid material. The maximum refractive index direction of the organic solid material may be substantially orthogonal to an optical axis of the lens. In some examples, the lens may be a Fresnel lens. In some examples, the lens may include a plurality of facets disposed along a major surface of the lens.

The high index organic solid material-containing thin films disclosed herein may be incorporated into a variety of optical systems and devices. For example, such thin films may be incorporated into a Fresnel lens or a prismatic lens. Example optical elements may be optically transparent.

As used herein, a material or element that is "transparent" or "optically transparent" may, for a given thickness, have a transmissivity within the visible light spectrum of at least approximately 80%, for example, approximately 80, 90, 95, 97, 98, 99, or 99.5%, including ranges between any of the foregoing values, and less than approximately 5% bulk haze, for example, approximately 0.1, 0.2, 0.4, 1, 2, or 4% bulk haze, including ranges between any of the foregoing values. Transparent materials will typically exhibit very low optical absorption and minimal optical scattering.

As used herein, the term "approximately" in reference to a particular numeric value or range of values may, in some examples, mean and include the stated value as well as all values within 10% of the stated value. Thus, by way of example, reference to the numeric value "50" as "approximately 50" may, in some examples, include values equal to $50\pm5$, i.e., values within the range 45 to 55.

As used herein, the terms "haze" and "clarity" may refer to an optical phenomenon associated with the transmission of light through a material, and may be attributed, for example, to the refraction of light within the material, for example, due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

In some examples, a device may include a display and an optical configuration configured to receive light from the display and direct the light from the display to a location where it may be viewed. The device may be a head-mounted device, such as an augmented reality device and/or a virtual reality device. The optical configuration may be configured to direct the display light to any eye of a user when the user wears the head-mounted device. In some examples, the optical configuration may further include a beam-splitter and a polarized reflector. In some examples, the optical configuration may provide a folded beam path for a light beam from the display.

In some examples, the optical configuration may include a lens including an organic solid, which may include a molecular solid such as a molecular crystalline solid. The organic solid may be optically anisotropic, and may be, for example, optically uniaxial or optically biaxial. In some examples, the organic solid may be a uniaxial optical material having a direction of higher refractive index and a direction of lower refractive index, where the terms higher and lower are relative to each other. In some examples, a lens may have an optical axis and the direction of higher refractive index may be perpendicular to the optical axis of the lens. The optical axis may extend through the center of the lens and a light beam incident on the lens along the optical axis may not be redirected by refraction. In some example, the organic solid may be a biaxial optical material having a direction of highest refractive index and two directions of relatively lower refractive index, where the directions may be mutually orthogonal. In some examples, the direction of highest refractive index may be perpendicular to the optical axis.

In some examples, a head-mounted device, such as augmented reality and/or virtual reality device, may include a Fresnel lens. The Fresnel lens may include an organic solid, such as an organic crystal, for example, an organic molecular crystal. In some examples, the organic solid may be an organic molecular solid. The Fresnel lens may have a lens body having at least one patterned surface. The patterned surface may include a plurality of oblique facets separated by steps.

In some examples, a lens may include a uniaxially-oriented or a biaxially-oriented organic solid crystalline material. The lens may include a Fresnel lens or a prismatic lens. The organic solid crystalline material may constitute a body of the lens, as well as a plurality of facets located at a surface thereof. The incorporation of a high refractive index and birefringence organic solid crystalline material into the lens may improve the resolution of the lens. In some examples, the direction of a maximum refractive index of the organic solid crystalline material may be aligned substantially orthogonal to an optical axis of the lens.

An optical element such as a lens may include a uniaxially-oriented or a biaxially-oriented organic solid material. The organic solid may constitute a body of the lens. In some examples, at least one surface of the lens may include a plurality of facets disposed on a surface thereof. The direction of a maximum refractive index of the organic solid material may be aligned substantially orthogonal to an optical axis of the lens. In some examples, a device may include a display and an optical configuration configured to receive display light from the display and direct the display light to a remote viewing location. In some examples, the optical configuration may include a lens, for example, a Fresnel lens.

In some examples, a lens (such as a Fresnel lens) may be formed on a substrate, such as a glass substrate. The substrate may be removed from the Fresnel lens after the lens is formed. In some examples, the lens may be left on the substrate, and the substrate may provide mechanical protection for the lens.

According to some examples, a high-resolution diffractive lens such as a Fresnel lens or a prismatic lens may include a high refractive index and birefringent organic solid material. In comparison to other lens materials, which for a Fresnel lens may enable 3 to 4 arc minutes of resolution, the presently-disclosed high index organic solid materials may be configured with less curvature, longer pitch, and an operable resolution of 1 arc minute or less. In some examples, a high refractive index may be greater than approximately 1.5 (e.g., at a typical operating temperature and at least one visible wavelength. An example optically anisotropic material may have a maximum refractive index that may be at least approximately 1.5, for example, at least approximately 1.6, at least approximately 1.8, or at least approximately 2.0.

In some examples, an optical element (e.g., a lens such as a Fresnel lens) may include an optically anisotropic organic solid, such as an optically uniaxial or optically biaxial organic solid. In some examples, an organic solid may be an organic molecular solid, and may include an organic molecular crystal. The direction of a maximum refractive index of the organic solid (e.g., at a particular temperature and wavelength) may be configured to be substantially orthogonal to an optical axis of the lens. In some examples, a device may include a display and an optical configuration configured to receive light from the display and direct the light to a remote location, such as the eyebox of a head-mounted device where the display may be viewed by at least one eye of a user. In some examples, the optical configuration may include a lens and at least one surface of the lens may include a plurality of facets, for example, to form a Fresnel lens.

EXAMPLE EMBODIMENTS

Example 1. A device may include a display and an optical configuration configured to receive display light from the display and direct the display light to a remote viewing location, where the optical configuration includes a lens, the lens includes an organic solid and the organic solid is optically anisotropic.

Example 2. The device of example 1, where the organic solid is a uniaxial optical material having a direction of higher refractive index.

Example 3. The device of any of examples 1 and 2, where the lens has an optical axis through a center of the lens and the direction of higher refractive index is perpendicular to the optical axis.

Example 4. The device of any of examples 1-3, where the organic solid is a biaxial optical material having a direction of highest refractive index.

Example 5. The device of any of examples 1-4, where the lens has an optical axis through a center of the lens, and the direction of highest refractive index is perpendicular to the optical axis.

Example 6. The device of any of examples 1-5, where the lens is a Fresnel lens.

Example 7. The device of example 6, where the Fresnel lens includes an organic solid body having at least one patterned surface.

Example 8. The device of example 7, where the at least one patterned surface includes a plurality of oblique facets separated by steps.

Example 9. The device of any of examples 7 and 8, where the organic solid body is located on a substrate, where the substrate includes glass.

Example 10. The device of any of examples 1-9, where the organic solid is an organic molecular solid.

Example 11. The device of any of examples 1-10, where the organic solid is an organic molecular crystal.

Example 12. The device of any of examples 1-11, where the device is a head-mounted device and the optical configuration is configured to direct the display light to any eye of a user when the user wears the head-mounted device.

Example 13. The device of any of examples 1-12, where the device is an augmented reality device.

Example 14. The device of any of examples 1-13, where the device is a virtual reality device.

Example 15. The device of any of examples 1-14, where the optical configuration further includes a beam-splitter and a polarized reflector.

Example 16. The device of any of examples 1-15, where the organic solid includes an organic molecular species, where the organic molecular species includes at least two aromatic ring structures.

Example 17. The device of any of examples 1-16, where the organic solid includes uniformly aligned organic molecular crystals.

Example 18. A method may include introducing an organic liquid into a mold and solidifying the organic liquid into an organic solid to form a Fresnel lens, where at least one surface of the organic solid includes a plurality of facets, the organic solid has optical anisotropy and a direction of a maximum refractive index of the organic solid is orthogonal to an optical axis of the Fresnel lens.

Example 19. The method of example 18, where the organic solid includes a molecular crystal.

Example 20. A method may include forming a patterned surface profile in an organic solid to form a Fresnel lens, where the organic solid is optically anisotropic and a direction of a maximum refractive index of the organic solid is orthogonal to an optical axis of the Fresnel lens.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 3700 in FIG. 37) or that visually immerses a user in an artificial reality (such as, e.g., virtual-reality system 3800 in FIG. 38). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 37, augmented-reality system 3700 may include an eyewear device 3702 with a frame 3710 configured to hold a left display device 3715(A) and a right display device 3715(B) in front of a user's eyes. Display devices 3715(A) and 3715(B) may act together or independently to present an image or series of images to a user. While augmented-reality system 3700 includes two displays, embodiments of this disclosure may be implemented in augmented-reality systems with a single NED or more than two NEDs.

In some embodiments, augmented-reality system 3700 may include one or more sensors, such as sensor 3740. Sensor 3740 may generate measurement signals in response to motion of augmented-reality system 3700 and may be located on substantially any portion of frame 3710. Sensor 3740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 3700 may or may not include sensor 3740 or may include more than one sensor. In embodiments in which sensor 3740 includes an IMU, the IMU may generate calibration data based on measurement signals from sensor 3740. Examples of sensor 3740 may include, without limitation, accelerometers, gyroscopes, magnetometers, other suitable types of sensors that detect motion, sensors used for error correction of the IMU, or some combination thereof.

In some examples, augmented-reality system 3700 may also include a microphone array with a plurality of acoustic transducers 3720(A)-3720(J), referred to collectively as acoustic transducers 3720. Acoustic transducers 3720 may represent transducers that detect air pressure variations induced by sound waves. Each acoustic transducer 3720 may be configured to detect sound and convert the detected sound into an electronic format (e.g., an analog or digital format). The microphone array in FIG. 37 may include, for example, ten acoustic transducers: 3720(A) and 3720(B), which may be designed to be placed inside a corresponding ear of the user, acoustic transducers 3720(C), 3720(D), 3720(E), 3720(F), 3720(G), and 3720(H), which may be positioned at various locations on frame 3710, and/or acoustic transducers 3720(1) and 3720(J), which may be positioned on a corresponding neckband 3705.

In some embodiments, one or more of acoustic transducers 3720(A)-(J) may be used as output transducers (e.g., speakers). For example, acoustic transducers 3720(A) and/or 3720(B) may be earbuds or any other suitable type of headphone or speaker.

The configuration of acoustic transducers 3720 of the microphone array may vary. While augmented-reality system 3700 is shown in FIG. 37 as having ten acoustic transducers 3720, the number of acoustic transducers 3720 may be greater or less than ten. In some embodiments, using higher numbers of acoustic transducers 3720 may increase the amount of audio information collected and/or the sensitivity and accuracy of the audio information. In contrast, using a lower number of acoustic transducers 3720 may decrease the computing power required by an associated controller 3750 to process the collected audio information. In addition, the position of each acoustic transducer 3720 of the microphone array may vary. For example, the position of an acoustic transducer 3720 may include a defined position on the user, a defined coordinate on frame 3710, an orientation associated with each acoustic transducer 3720, or some combination thereof.

Acoustic transducers 3720(A) and 3720(B) may be positioned on different parts of the user's ear, such as behind the pinna, behind the tragus, and/or within the auricle or fossa. Or, there may be additional acoustic transducers 3720 on or surrounding the ear in addition to acoustic transducers 3720 inside the ear canal. Having an acoustic transducer 3720 positioned next to an ear canal of a user may enable the microphone array to collect information on how sounds arrive at the ear canal. By positioning at least two of acoustic transducers 3720 on either side of a user's head (e.g., as binaural microphones), augmented-reality device 3700 may simulate binaural hearing and capture a 3D stereo sound field around about a user's head. In some embodiments, acoustic transducers 3720(A) and 3720(B) may be connected to augmented-reality system 3700 via a wired connection 3730, and in other embodiments acoustic transducers 3720(A) and 3720(B) may be connected to augmented-reality system 3700 via a wireless connection (e.g., a BLUETOOTH connection). In still other embodiments, acoustic transducers 3720(A) and 3720(B) may not be used at all in conjunction with augmented-reality system 3700.

Acoustic transducers 3720 on frame 3710 may be positioned in a variety of different ways, including along the length of the temples, across the bridge, above or below display devices 3715(A) and 3715(B), or some combination thereof. Acoustic transducers 3720 may also be oriented such that the microphone array is able to detect sounds in a wide range of directions surrounding the user wearing the augmented-reality system 3700. In some embodiments, an optimization process may be performed during manufacturing of augmented-reality system 3700 to determine relative positioning of each acoustic transducer 3720 in the microphone array.

In some examples, augmented-reality system 3700 may include or be connected to an external device (e.g., a paired device), such as neckband 3705. Neckband 3705 generally represents any type or form of paired device. Thus, the following discussion of neckband 3705 may also apply to various other paired devices, such as charging cases, smart watches, smart phones, wrist bands, other wearable devices, hand-held controllers, tablet computers, laptop computers, other external compute devices, etc.

As shown, neckband 3705 may be coupled to eyewear device 3702 via one or more connectors. The connectors may be wired or wireless and may include electrical and/or non-electrical (e.g., structural) components. In some cases, eyewear device 3702 and neckband 3705 may operate independently without any wired or wireless connection between them. While FIG. 37 illustrates the components of eyewear device 3702 and neckband 3705 in example locations on eyewear device 3702 and neckband 3705, the components may be located elsewhere and/or distributed differently on eyewear device 3702 and/or neckband 3705. In some embodiments, the components of eyewear device 3702 and neckband 3705 may be located on one or more additional peripheral devices paired with eyewear device 3702, neckband 3705, or some combination thereof.

Pairing external devices, such as neckband 3705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 3700 may be provided by a paired device or shared between a paired device and an eyewear device, thus reducing the weight, heat profile, and form factor of the eyewear device overall while still retaining desired functionality. For example, neckband 3705 may allow components that would otherwise be included on an eyewear device to be included in neckband 3705 since users may tolerate a heavier weight load on their shoulders than they would tolerate on their heads. Neckband 3705 may also have a larger surface area over which to diffuse and disperse heat to the ambient environment. Thus, neckband 3705 may allow for greater battery and computation capacity than might otherwise have been possible on a stand-alone eyewear device. Since weight carried in neckband 3705 may be less invasive to a user than weight carried in eyewear device 3702, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 3705 may be communicatively coupled with eyewear device 3702 and/or to other devices. These other devices may provide certain functions (e.g., tracking, localizing, depth mapping, processing, storage, etc.) to augmented-reality system 3700. In the embodiment of FIG. 37, neckband 3705 may include two acoustic transducers (e.g., 3720(1) and 3720(J)) that are part of the microphone array (or potentially form their own microphone subarray). Neckband 3705 may also include a controller 3725 and a power source 3735.

Acoustic transducers 3720(1) and 3720(J) of neckband 3705 may be configured to detect sound and convert the detected sound into an electronic format (analog or digital). In the embodiment of FIG. 37, acoustic transducers 3720(1) and 3720(J) may be positioned on neckband 3705, thereby increasing the distance between the neckband acoustic transducers 3720(1) and 3720(J) and other acoustic transducers 3720 positioned on eyewear device 3702. In some cases, increasing the distance between acoustic transducers 3720 of the microphone array may improve the accuracy of beamforming performed via the microphone array. For example, if a sound is detected by acoustic transducers 3720(C) and 3720(D) and the distance between acoustic transducers 3720(C) and 3720(D) is greater than, for example, the distance between acoustic transducers 3720(D) and 3720(E), the determined source location of the detected sound may be more accurate than if the sound had been detected by acoustic transducers 3720(D) and 3720(E).

Controller 3725 of neckband 3705 may process information generated by the sensors on neckband 3705 and/or augmented-reality system 3700. For example, controller 3725 may process information from the microphone array that describes sounds detected by the microphone array. For each detected sound, controller 3725 may perform a direction-of-arrival (DOA) estimation to estimate a direction from which the detected sound arrived at the microphone array. As the microphone array detects sounds, controller 3725 may populate an audio data set with the information. In embodiments in which augmented-reality system 3700 includes an inertial measurement unit, controller 3725 may compute all inertial and spatial calculations from the IMU located on eyewear device 3702. A connector may convey information between augmented-reality system 3700 and neckband 3705 and between augmented-reality system 3700 and controller 3725. The information may be in the form of optical data, electrical data, wireless data, or any other transmittable data form. Moving the processing of information generated by augmented-reality system 3700 to neckband 3705 may reduce weight and heat in eyewear device 3702, making it more comfortable to the user.

Power source 3735 in neckband 3705 may provide power to eyewear device 3702 and/or to neckband 3705. Power source 3735 may include, without limitation, lithium ion batteries, lithium-polymer batteries, primary lithium batteries, alkaline batteries, or any other form of power storage. In some cases, power source 3735 may be a wired power source. Including power source 3735 on neckband 3705 instead of on eyewear device 3702 may help better distribute the weight and heat generated by power source 3735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 3800 in FIG. 38, that mostly or completely covers a user's field of view. Virtual-reality system 3800 may include a front rigid body 3802 and a band shaped to fit around a user's head. Virtual-reality system 3800 may also include output audio transducers 3806(A) and 3806(B). Furthermore, while not shown in FIG. 38, front rigid body 3802 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 3700 and/or virtual-reality system 3800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 3700 and/or virtual-reality system 3800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 3700 and/or virtual-reality system 3800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary examples disclosed herein. This exemplary description is not intended to be exhaustive or to be limited to any precise form disclosed. Many modifications and variations are possible without departing from the spirit and scope of the present disclosure. The examples disclosed herein should be considered in all respects illustrative and not restrictive. Reference may be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on," "over," or "overlying' another element, it may be located directly on at least a portion of the other element, or one or more intervening elements may also be present. In contrast, when an element is referred to as being "directly on," "directly over," or "directly overlying" another element, it may be located on at least a portion of the other element, with no intervening elements present.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

While various features, elements or steps of particular examples may be disclosed using the transitional phrase "comprising," it is to be understood that alternative examples, including those that may be described using the transitional phrases "consisting" or "consisting essentially of," are implied. Thus, for example, implied alternative examples to a releasing agent that comprises or includes silicone include examples where a releasing agent consists of silicone and examples where a releasing agent consists essentially of silicone.

What is claimed is:

1. A device comprising:
a display; and
an optical configuration configured to:
   receive display light from the display; and
   direct the display light to a remote viewing location, wherein:
      the optical configuration comprises a lens;
      the lens comprises an organic solid; and
      the organic solid comprises a uniformly aligned refractive index profile, uniformly aligned organic molecular crystals, and is optically anisotropic.

2. The device of claim 1, wherein the organic solid is a uniaxial optical material having a direction of higher refractive index.

3. The device of claim 2, wherein:
the lens has an optical axis through a center of the lens; and
the direction of higher refractive index is perpendicular to the optical axis.

4. The device of claim 1, wherein the organic solid is a biaxial optical material having a direction of highest refractive index.

5. The device of claim 4, wherein:
the lens has an optical axis through a center of the lens; and
the direction of highest refractive index is perpendicular to the optical axis.

6. The device of claim 1, wherein the lens is a Fresnel lens.

7. The device of claim 6, wherein the Fresnel lens comprises an organic solid body having at least one patterned surface.

8. The device of claim 7, wherein the at least one patterned surface comprises a plurality of oblique facets separated by steps.

9. The device of claim 7, wherein the organic solid body is located on a first substrate, wherein:
the first substrate comprises glass.

10. The device of claim 1, wherein the organic solid is an organic molecular solid.

11. The device of claim 1, wherein the organic solid is an organic molecular crystal.

12. The device of claim 1, wherein:
the device is a head-mounted device; and
the optical configuration is configured to direct the display light to any eye of a user when the user wears the head-mounted device.

13. The device of claim 1, wherein the device is an augmented reality device.

14. The device of claim 1, wherein the device is a virtual reality device.

15. The device of claim 1, wherein the optical configuration further comprises a beam-splitter and a polarized reflector.

16. The device of claim 1, wherein the organic solid comprises an organic molecular species, wherein:
the organic molecular species comprises at least two aromatic ring structures.

17. The device of claim 1, wherein the organic solid comprises a uniform thickness and a uniform molecular orientation.

18. A method comprising:
introducing an organic liquid into a mold; and
solidifying the organic liquid into an organic solid to form a Fresnel lens,
wherein:
   at least one surface of the organic solid comprises a plurality of facets;
   the organic solid comprises uniformly aligned organic molecular crystals, a uniformly aligned refractive index profile, and has optical anisotropy; and
   a direction of a maximum refractive index of the organic solid is orthogonal to an optical axis of the Fresnel lens.

19. The method of claim 18, wherein the organic solid comprises a molecular crystal.

20. A method, comprising:
forming a patterned surface profile in an organic solid to form a Fresnel lens, wherein:
   the organic solid comprises a uniformly aligned refractive index profile, uniformly aligned organic molecular crystals, and is optically anisotropic; and
   a direction of a maximum refractive index of the organic solid is orthogonal to an optical axis of the Fresnel lens.

* * * * *